(12) United States Patent
Cho

(10) Patent No.: US 8,243,228 B2
(45) Date of Patent: Aug. 14, 2012

(54) LIGHTING DEVICE, DISPLAY DEVICE AND TELEVISION RECEIVER

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/148,951

(22) PCT Filed: Dec. 16, 2009

(86) PCT No.: PCT/JP2009/070951
§ 371 (c)(1),
(2), (4) Date: Aug. 11, 2011

(87) PCT Pub. No.: WO2010/100803
PCT Pub. Date: Sep. 10, 2010

(65) Prior Publication Data
US 2011/0317091 A1 Dec. 29, 2011

(30) Foreign Application Priority Data
Mar. 5, 2009 (JP) ................. 2009-052100

(51) Int. Cl.
*G02F 1/1333* (2006.01)
(52) U.S. Cl. ............ 349/58; 349/70; 362/630; 362/631; 362/632
(58) Field of Classification Search .................. 362/630, 362/631, 632
See application file for complete search history.

(56) References Cited

U.S. PATENT DOCUMENTS

| 7,325,941 B2 * | 2/2008 | Kim et al. ................. 362/225 |
| 2007/0230169 A1 | 10/2007 | Kwon et al. |
| 2008/0218089 A1 | 9/2008 | Takata |
| 2009/0256789 A1 | 10/2009 | Takata |

FOREIGN PATENT DOCUMENTS

| JP | 2007-280955 A | 10/2007 |
| JP | 2008-158268 A | 7/2008 |
| JP | 2008-251543 A | 10/2008 |

OTHER PUBLICATIONS

Official Communication issued in International Patent Application No. PCT/JP2009/070951, mailed on Feb. 16, 2010.

* cited by examiner

*Primary Examiner* — Richard Kim
(74) *Attorney, Agent, or Firm* — Keating & Bennett, LLP

(57) ABSTRACT

The backlight unit 12 includes cold cathode tubes 18, a chassis 14, inverter boards 20, relay connectors 21, and covers 22. The chassis 14 houses the cold cathode tubes 18. The inverter boards 20 are arranged on a side of the chassis 14 opposite from the cold cathode tubes 19. The inverter boards 20 are configured to supply drive power to the cold cathode tubes 18. The relay connectors 21 are mounted to the chassis 14 such that the inverter boards 20 are connected thereto so as to be removal therefrom in one of the directions along a board surface of the inverter board 20. The relay connectors 21 are configured to relay power from the inverter boards 20 to the cold cathode tubes 18. The covers 22 are made of material having a lower strength than the chassis 14 and arranged between the chassis 14 and the inverter boards 20. The chassis 14 has receiving portions 35 that project toward the inverter boards 20 and receive the inverter boards 20. The covers 22 have spacer portions 38 between the receiving portions 35 and the inverter boards 20.

42 Claims, 23 Drawing Sheets

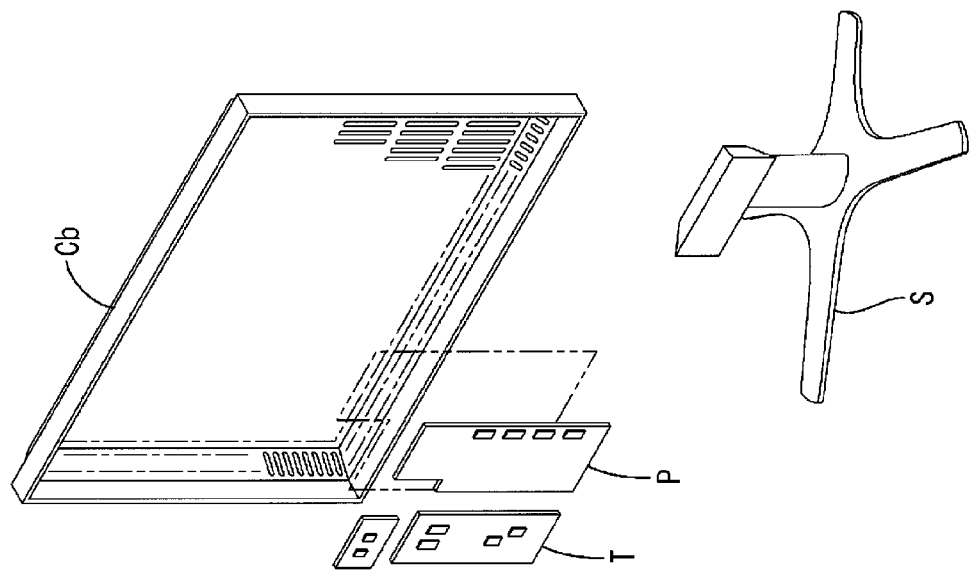
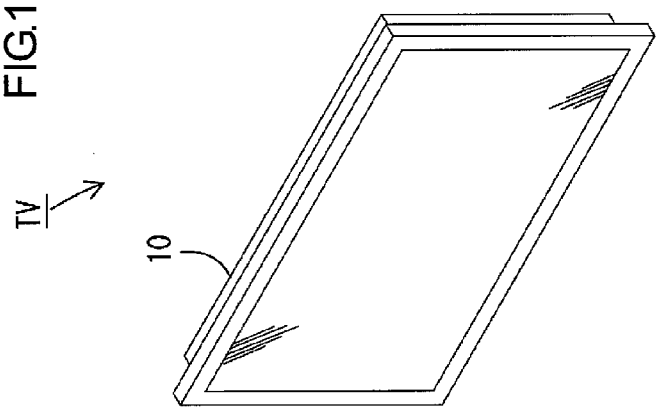
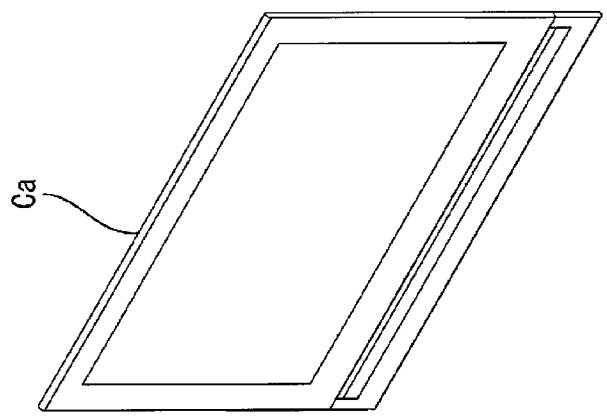
FIG.1

FIG.12
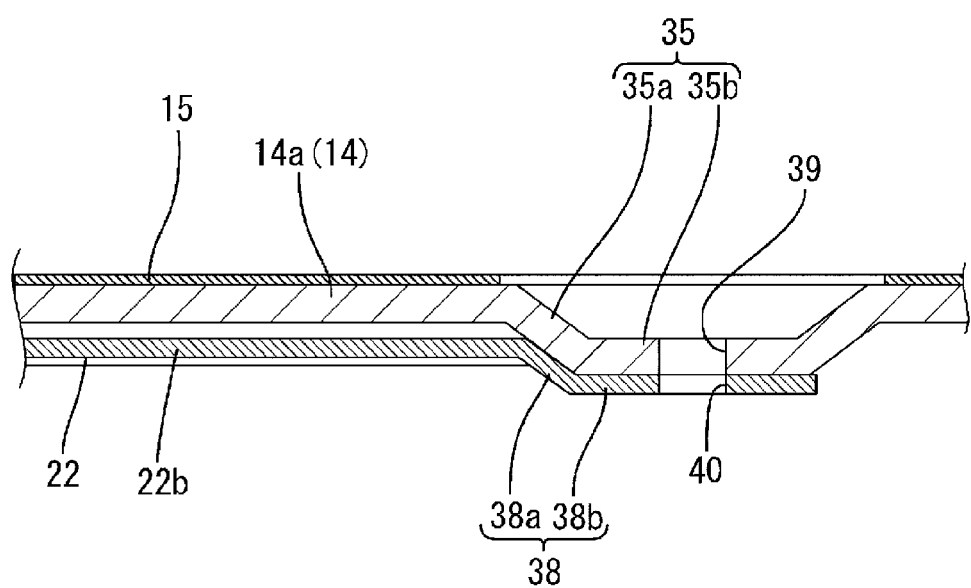
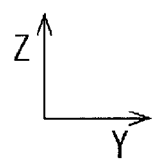

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device such as a liquid crystal television receiver does not emit light. Therefore, a backlight unit is required as a separate lighting unit. The backlight unit is arranged behind the liquid crystal panel (on an opposite side from the display surface). It includes a chassis, a number of cold cathode tubes, an optical member and an inverter board. The chassis has an opening in a surface on the liquid crystal panel side. The cold cathode tubes are housed in the chassis. The optical member includes a plurality of pieces (e.g., a diffuser). It is arranged so as to cover the opening of the chassis and configured to effectively direct rays of light emitted from the cold cathode tubes toward the liquid crystal panel. The inverter board is provided for supplying power to the cold cathode tubes.

Patent Document 1 discloses an example configuration for making electrical connection between an inverter board and cold cathode tubes. In this configuration, the cold cathode tubes are arranged on the front side inside the chassis and the inverter board is arranged on the rear side outside the chassis. Relay connectors are mounted to the chassis so as to penetrate through the chassis. The cold cathode tubes are connected to internal ends of the relay connectors. The inverter board is connected to external ends of the relay connectors.

Patent Document 1: Japanese Unexamined Patent Publication No. 2007-280955

Problem to be Solved by the Invention

In the above configuration, receiving parts protrude from the chassis toward the inverter board. The inverter board is placed on the receiving parts and fixed to the chassis by bolts and nuts with the bolts passed through mounting holes formed in the receiving parts.

To connect the inverter board to the relay connectors, the inverter board is held so as to face the chassis and slid toward the relay connectors. If the receiving parts that protrude from the chassis touch components mounted on the inverter board or wiring patterns on the inverter board, the components and wiring patterns may be damaged. This is because the receiving parts of the chassis made of a metal material that is stronger than a resin material. Especially, if the metal receiving parts have burrs, the components and the wiring patterns may be damaged more likely and severely.

To avoid such a problem, the components and the wiring patterns are not arranged in areas of the inverter board where the receiving parts may touch them during the connecting of the inverter board to the relay connectors. This could be an obstacle for increasing a layout density of the components or the wiring patterns, or for reducing the size of the inverter board.

DISCLOSURE OF THE PRESENT INVENTION

The present invention was made in view of the foregoing circumstances. An object of the present invention is to increase an arrangement area of a power supply board, in which components can be arranged.

Means for Solving the Problem

A lighting device of the present invention includes a light source, a chassis, a power supply, at least one relay connector, and a cover. The chassis houses the light source. The power supply board is arranged on a chassis side opposite from the light source and configured to supply drive power to the light source. The relay connector is mounted to the chassis such that the power supply board is connected thereto so as to be removable in one direction along a board surface of the power supply board. The relay connector is configured to relay power supply from the power supply board to the light source. The cover is made of material having a strength higher than the chassis and arranged between the chassis and the power supply board. The chassis has at least one receiving portion receiving the power supply board. The receiving portion protrudes toward the power supply board. The cover has at least one spacer portion arranged between the receiving portion and the power supply board.

The power supply board is received by the receiving portion of the chassis via the spacer portion of the cover that is made of material having higher strength than the chassis. Therefore, the power supply board does not touch the receiving portion of the chassis that is made of material having higher strength than the cover during connecting or disconnecting of the power supply board to or from the relay connector. Thus, components mounted on the power supply board are less likely to be damaged. With this configuration, a large area of the power supply board can be used as an arrangement area in which the components can be arranged. Therefore, the arrangement density of the components on the power supply board can be increased and the size of the power supply board can be reduced.

BRIEF DESCRIPTION OF THE DRAWINGS

FIG. 1 is an exploded perspective view of a television receiver according to the first embodiment of the present invention;

FIG. 12 is a cross-sectional view along line xii-xii in FIG. 6;

BEST MODE FOR CARRYING OUT THE INVENTION

<First Embodiment>

Figure 2:
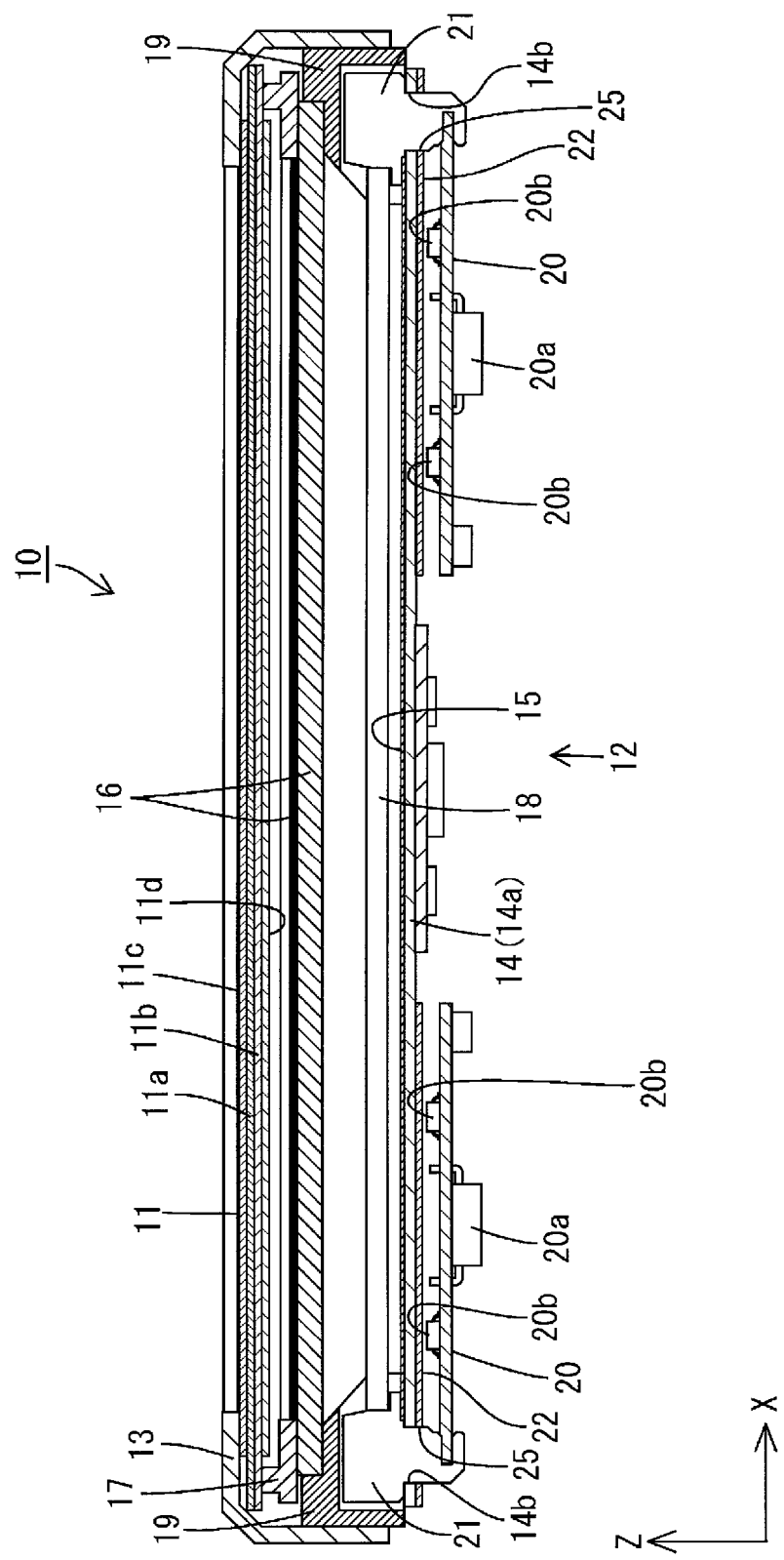
FIG. 2 is a cross-sectional view of a display device along a long-side direction.

The first embodiment of the present invention will be explained with reference to FIGS. 1 to 23. In this embodiment, a liquid crystal display device 10 will be explained. X-axes, Y-axes and Z-axes are present in some drawings to indicate orientations of the liquid crystal display device 10. In FIG. 2, the upper side and the lower side correspond to the front side (the front-surface side, the light exit side) and the rear side (the rear-surface side, an opposite side from the light exit side), respectively.

As illustrated in FIG. 1, the television receiver TV includes the liquid crystal display device 10 (a display device), a front cabinet Ca, a rear cabinet Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 has a landscape rectangular overall shape. As illustrated in FIG. 2, the liquid crystal display device 10 includes a liquid crystal panel 11, which is a display panel 11, and a backlight unit 12 (a lighting device), which is an external light source. The liquid crystal panel 11 and the backlight unit 12 are held together by a frame-shaped bezel 13.

Next, the liquid crystal panel 11 and the backlight unit 12 included in the liquid crystal display device 10 will be explained. The display panel 11 has a rectangular plan-view shape. As illustrated in FIG. 2, it includes a pair of glass substrates 11a and 11b bonded together with a predetermined gap therebetween and a liquid crystal layer (not shown) sealed between the glass substrates 11a and 11b. On the glass substrate 11a, switching components (e.g., TFTs), pixel electrodes and an alignment film are arranged. The switching components are connected to source lines and gate lines that are perpendicular to each other. The pixel electrodes are connected to the switching components. On the other glass substrate 1ib, color filter having color sections of red (R), green (G) and blue (B) arranged in a matrix, counter electrodes and an alignment film are arranged. Image data and various kinds of control signals for displaying images are feed from a drive circuit board, which is not shown, to the source lines, the gate lines and the counter electrode. Polarizing plates 11c and 1id are arranged on outer surfaces of the glass substrates 11a and 11b, respectively.

As illustrated in FIG. 2, the backlight unit 12 is a so-called direct backlight including light sources that are arranged directly behind the liquid crystal panel 11. The backlight unit 12 includes a chassis 14, a reflection sheet 15, an optical member 16, a frame 17, a plurality of cold cathode tubes 18 (light sources), and holders 19. The chassis 14 has a box-like overall shape and an opening on the front side (the light exit side, the liquid crystal panel 11 side). The reflection sheet 15 is placed inside the chassis 14. The optical member 16 includes a plurality of pieces. It is arranged so as to cover the opening. The frame 17 holds the optical member 16. The cold cathode tubes 18 are arranged parallel to each other and housed in the chassis 14. The holders 19 cover the respective ends of the cold cathode tubes 18 so as to block light. Each holder 19 has light reflectivity. The backlight unit 12 further includes inverter boards 20 (power supply boards), relay connectors 21, and covers 22. The inverter bards 20 are arranged on the rear of the chassis 14. The relay connectors 21 are provided for relaying power supply from the inverter boards 20 to the cold cathode tubes 18. The covers 22 are arranged between the chassis 14 and the inverter boards 20.

The chassis 14 is made of metal, for instance, aluminum. The chassis 14 includes a bottom plate 14a having a rectangular plan-view shape similar to the liquid crystal panel 11. The long-side direction and the short-side direction of the bottom plate 14a match the X-axis direction and the Y-axis direction indicated in the drawings, respectively. The bottom plate 14a has connector insertion holes 14b in end areas of the long dimension thereof. The connector insertion holes 14b are through holes through which the relay connectors 21 are passed. A plurality of them (the number required for the cold cathode tubes 18 and the relay connectors 21) are arranged along the Y-axis direction (the short sides of the bottom plate 14a) so as to be parallel to each other. The reflection sheet 15 is made of white synthetic resin having high light reflectivity. It is placed over the inner surface of the chassis 14 so as to cover substantially an entire area and configured to reflect rays of light from the cold cathode tubes 18 toward the optical members 16 (the light exit side). The reflection sheet 15 has holes continue into the connector insertion holes 14b.

Each optical member 16 has a rectangular shape similar to the bottom plate 14a of the chassis 14 or the liquid crystal panel 11. The optical members 16 include a diffuser plate, a diffuser sheet, a lens sheet and a brightness enhancement sheet arranged in this order from the rear side. They are configured to convert light emitted from each cold cathode tube, which is a linear light source, into planar light.

The frame 17 is formed in a frame shape along the outer edges of the liquid crystal panel 11 and the optical members 16. The frame 17 is arranged in front of the optical members 16. The outer edges of the optical members 16 are sandwiched between the frame 17 and the holders 19. The frame 17 supports the liquid crystal panel 11 from the rear side. The liquid crystal panel 11 is sandwiched between the frame 17 and the bezel 13 that is arranged in front of the liquid crystal panel 11.

Figure 3:
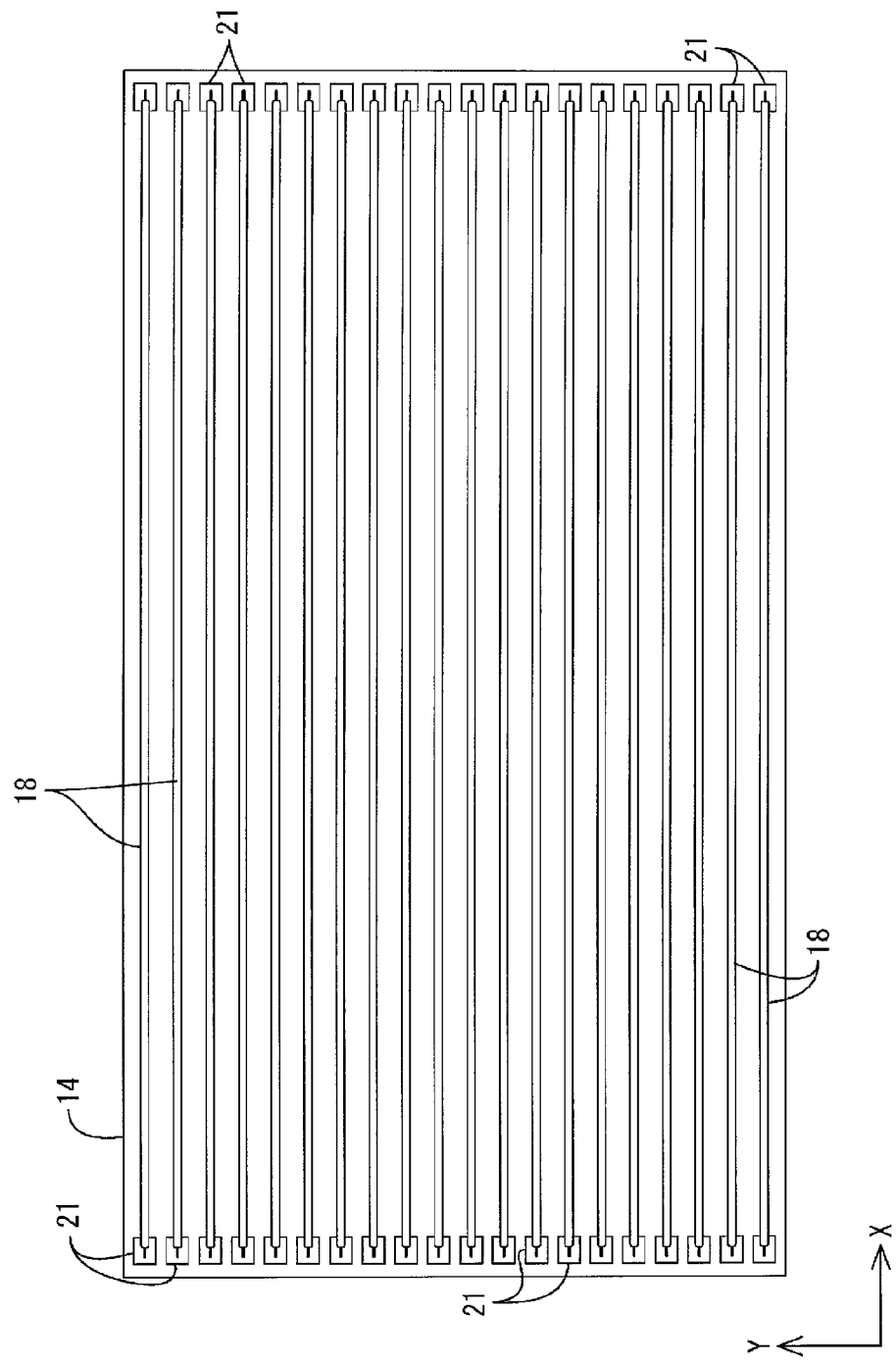
FIG. 3 is a plan view of a chassis with cold cathode tubes housed therein.

The cold cathode tubes 18 are one kind of linear light sources (tubular light sources). As illustrated in FIG. 3, the cold cathode tubes 18 are mounted inside the chassis 14 with the axial direction thereof (the X-axis direction) aligned with the long-side direction of the chassis 14. They are arranged such that the axes thereof are substantially parallel to each other and a predetermined distance away from each other in the short side direction of the chassis 14 (the Y-axis direction).

The cold cathode tubes 18 are one kind of discharge tubes. Each of them includes an elongated glass tube 18a, a pair of electrodes (not shown), and a pair of outer leads 18b. The glass tube 18a has a circular cross section and closed ends. The electrodes are enclosed in the glass tube 18a and located at the respective ends of the glass tube 18a. The outer leads 18b project from the respective ends of the glass tube 18a to the outside. Mercury that is a luminescent material is sealed in the glass tube 18a and a fluorescent material is applied to the inner walls of the glass tube 18a (neither the luminescent material nor the fluorescent material are shown). Each outer lead 18b is made of metal having electrical conductivity and formed in an elongated round post-like shape. It projects outward (in an opposite direction to the electrode) from the end of the glass tube 18a and extends along the axial direction (the X-axis direction). The internal end of the outer lead 18b is connected to the electrode inside the glass tube 18a and thus the outer lead 18b and the electrode are at the same potential.

Each holder 19 is made of white synthetic resin having high light reflectivity. As illustrated in FIG. 2, it extends along the short side of the chassis 14 and has a box-like shape with an opening on the rear side. The holders 19 are attached to the respective ends of the long side of the chassis 14 so as to collectively cover the respective ends of the cold cathode tubes 18 (non-light-emitting portions) arranged at the ends in a parallel layout.

Each inverter board 20 includes a base plate made of synthetic resin (e.g., a paper phenol or a glass epoxy resin) on which wiring patterns are formed and various electronic components are mounted. Specifically, lead components 20a including power transformers and capacitors are mounted on the rear surface (the surface away from the chassis 14). On the front surface (the surface close to the chassis 14), wiring patterns (not shown) are formed and chip components 20b including resistors, diodes and capacitors are mounted. Lead of the lead components 20a are passed through the inverter board 20 so as to project from the front surface via the through holes and soldered to the wiring patterns. The chip components 20b are surface-mounted on the wiring patterns on the front surface of the inverter board 20. The inverter board 20 is connected to the power source P of the liquid crystal display device 10. It is configured to step up an input voltage from the power source P and to output a voltage higher than the input voltage. The output voltage is applied to each cold cathode tube 18. The inverter board 20 controls on-and-off of the cold cathode tubes 18. In FIGS. 7 to 23, the lead components 20a and the chip components 20b are not shown.

Figure 4:
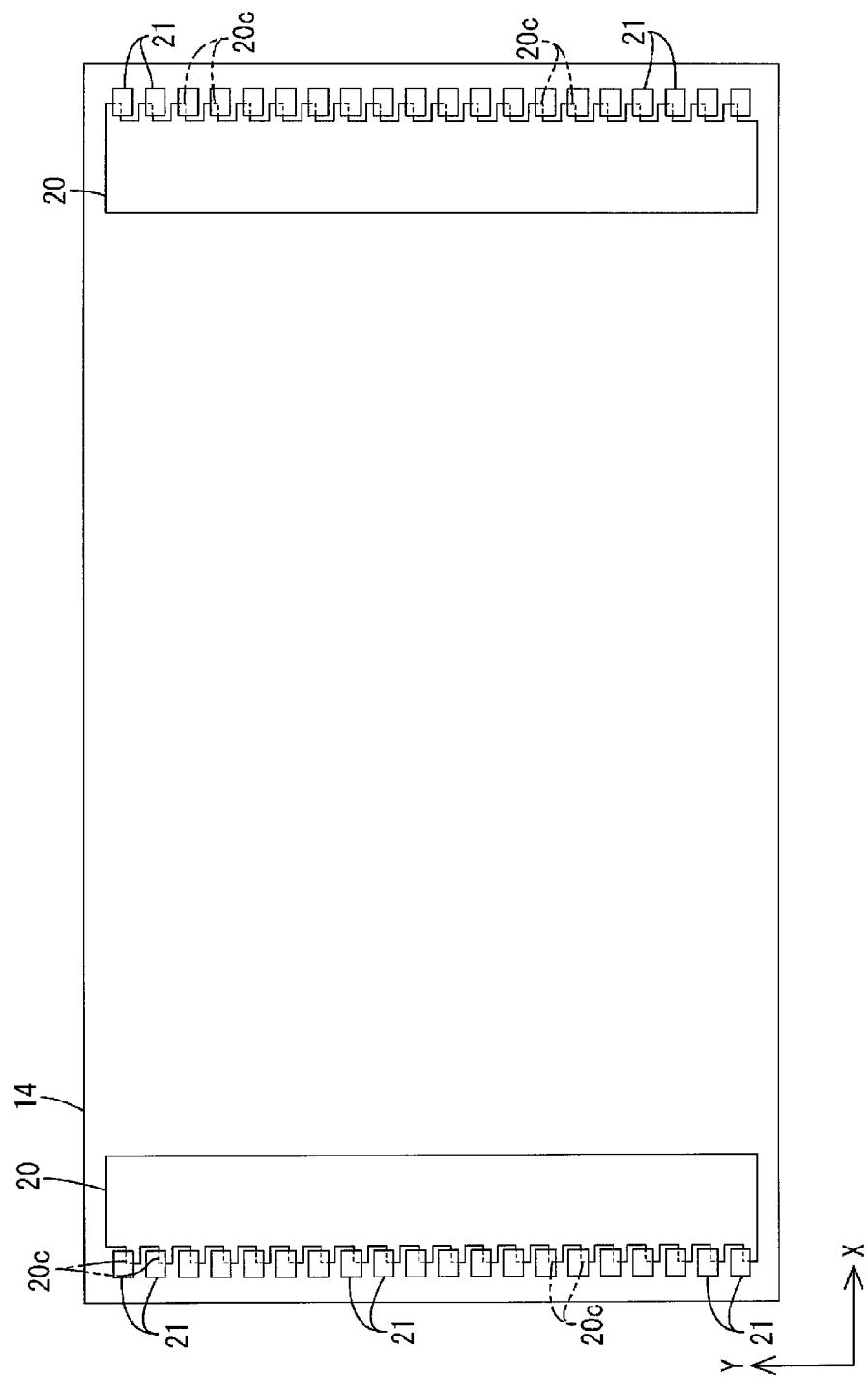
FIG. 4 is a bottom view of the chassis with inverter boards mounted thereto.

As illustrated in FIG. 4, the inverter boards 20 are mounted on the rear surface of the bottom plate 14a of the chassis 14 (the surface away from the cold cathode tubes 18). The inverter boards 20 are arranged at the respective ends of the long dimension of the bottom plate 14a so as to be symmetric. Each inverter board 20 has a rectangular plan-view shape. The inverter board 20 is placed with the board surface thereof substantially parallel to the board surface of the bottom plate 14a of the chassis 14 (the surface on the X-Y plane and perpendicular to the Z-axis that corresponds to the thickness direction of the liquid crystal display device 10) and with the long-side direction thereof aligned with the short-side direction of the bottom plate 14a (the Y-axis direction, a direction perpendicular to the axial direction of the cold cathode tube 18). The inverter boards 20 are fixed to the bottom plate 14 with fixing structures, which will be explained later.

Figure 13:
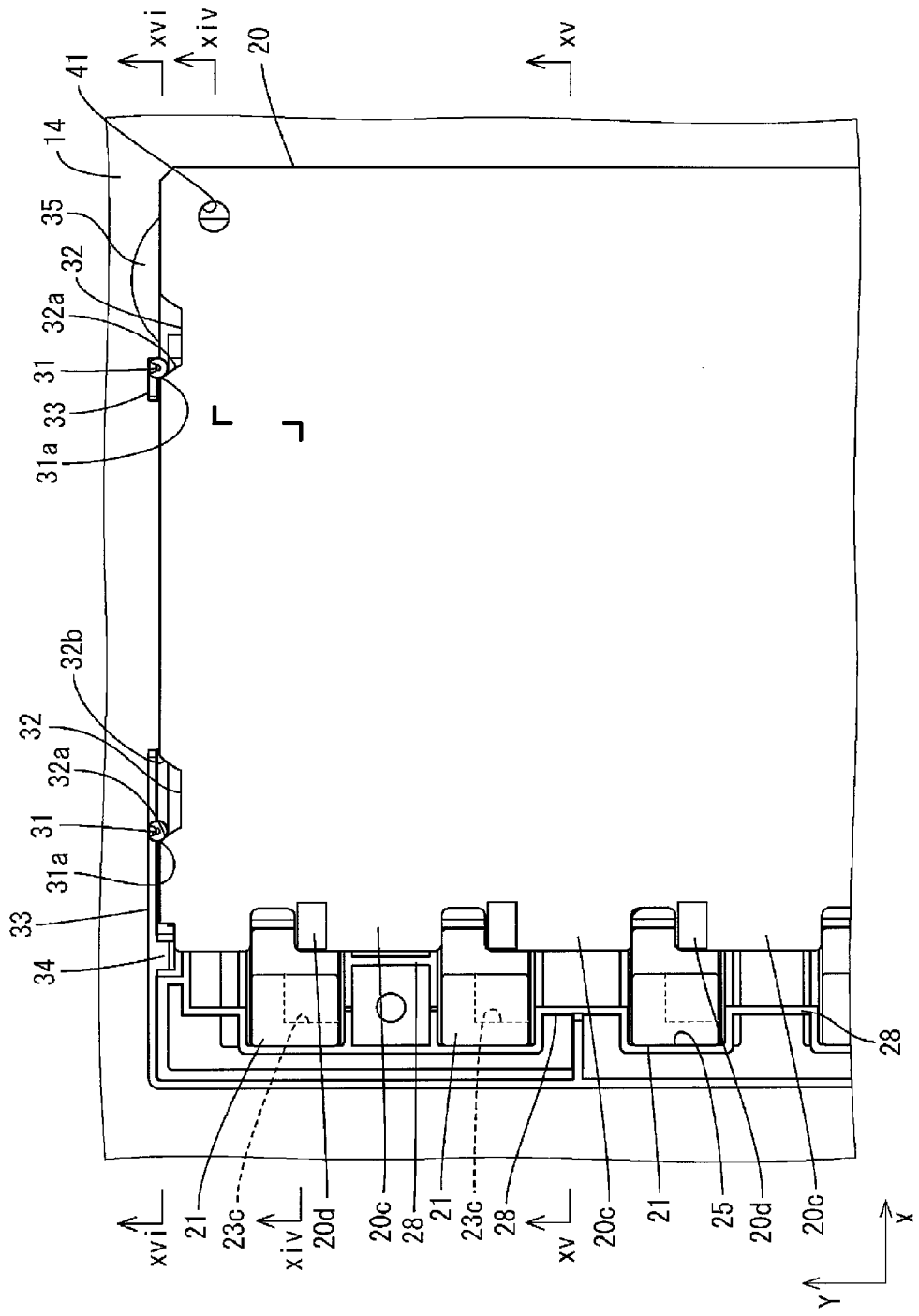
FIG. 13 is a magnified partial bottom view with the inverter board at a non-connected position.

Each inverter board 20 has connector connecting portions 20c at a front end with respect to the connecting direction of the inverter board 20 to the relay connector 21. The connector connecting portions 20c are inserted in the relay connectors 21 and connected thereto. A plurality of the connector connecting portions 20c are provided along the long side of the inverter board 20 (one for each relay connector 21) by cutting out some parts of the front end of the inverter board 20. Namely, the front end of the inverter board 20 is formed in a comb-like shape. As illustrated in FIG. 13, each connector connecting portion 20c is inserted in the corresponding relay connector 21. Terminals 20d extending from the wiring pattern are provided at distal ends of the respective connector connecting portion 20c. A width of each connector connecting portion 20c is larger than that of an opening of a board holding hole 23c of each relay connector 21, which will be explained later. A difference between them is substantially equal to a distance between the adjacent relay connectors 21.

The inverter board 20 and the bottom plate 14a of the chassis 14 (or the cover 22) are arranged so as to face each other with a predetermined gap therebetween. The inverter board 20 can be moved between a non-connected position (see FIGS. 13 to 16) and a connected position (see FIGS. 17 to 23) in the X-axis direction (a first direction, a short-side direction of the inverter board 20) along the board surface of the inverter board 20. At the non-connected position, the connector connecting portions 20c are removed from the relay connectors 21 and the inverter board 20 is held a predetermined distance away from the bottom plate 14a of the chassis 14 so as to face the bottom plate 14a. At the connected position, the connector connecting portions 20c are inserted in the relay connectors 21 and the inverter board 20 is held the predetermined distance away from the bottom plate 14a in the same manner as the non-connected position. Specifically, as illustrated in FIGS. 13 to 16, the connector connecting portions 20c are positioned a predetermined distance from the relay connectors 21 in the X-axis direction and not in contact with terminals 24 of the relay connectors 21 at the non-connected position. As illustrated in FIGS. 17 to 23, the connector connecting portions 20c are inserted in the relay connectors 21 and the terminals 20d are in contact with the terminals 24 of the relay connectors 21 at the connected position. The inverter board 20 can be moved between the non-connected position and the connected position in a substantially horizontal direction along the X-axis direction. A direction from the non-connected position to the connected position is referred to as a connecting direction, and a direction from the connected position to the non-connected position is referred to as a disconnecting direction (a pull-out direction). A direction toward the right in the X-axis direction in FIGS. 7-9, 14-16, and 18-20 corresponds to the connecting direction, and a direction toward the left in the X-axis direction in those drawings corresponds to the disconnecting direction. In the following descriptions about the connecting direction and the disconnecting direction of each inverter board 20 to or from the relay connectors 21, the left inverter board 20 and the left relay connectors 21 in FIG. 4 are referred. About the front and the rear, the right side and the left side in the X-axis direction in FIGS. 7-9, 14-16, and 18-20 are referred to as the front and the rear, respectively.

Figure 7:
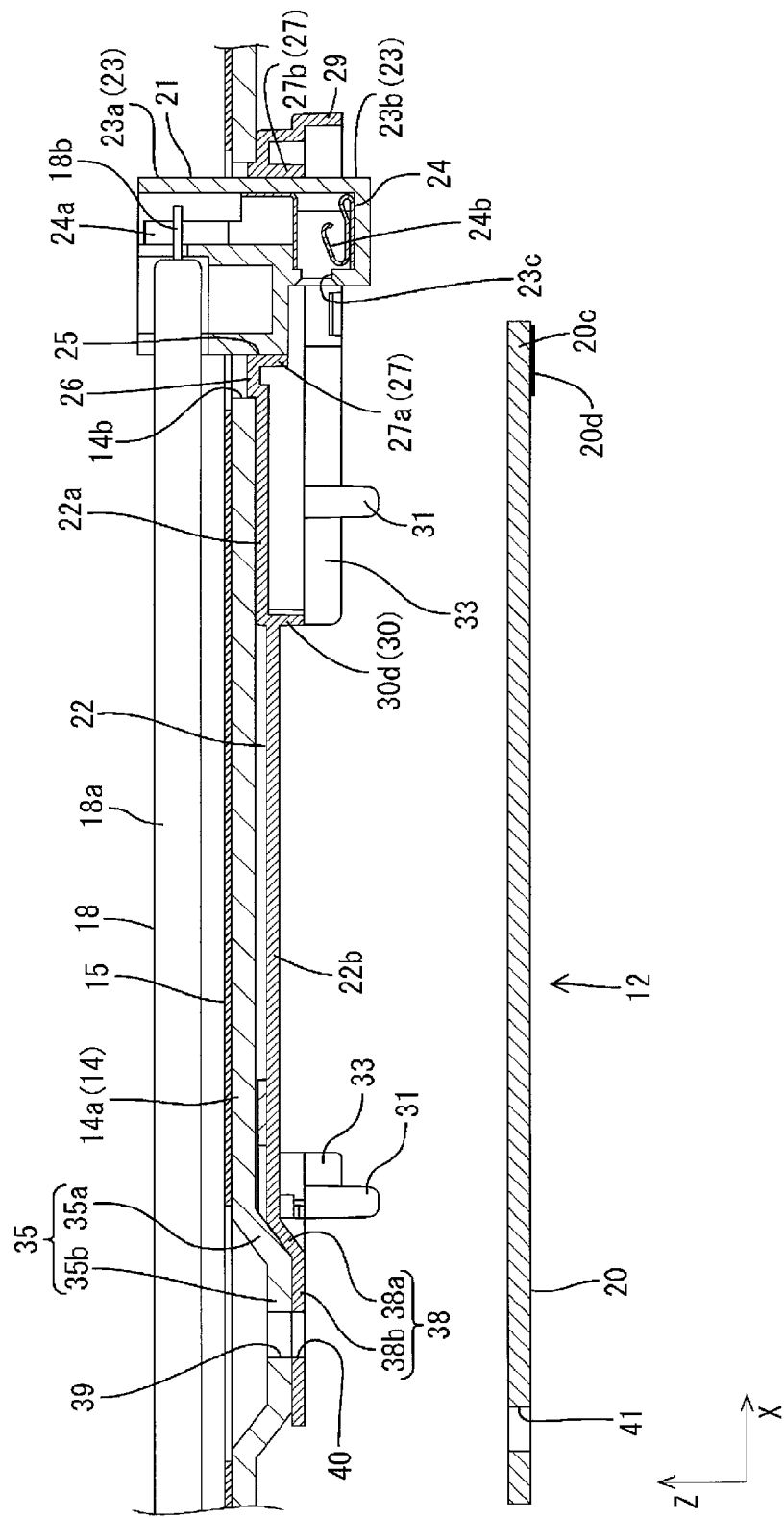
FIG. 7 is a cross-sectional view along line vii-vii in FIG. 6 with the inverter board at a removal position.
Figure 10:
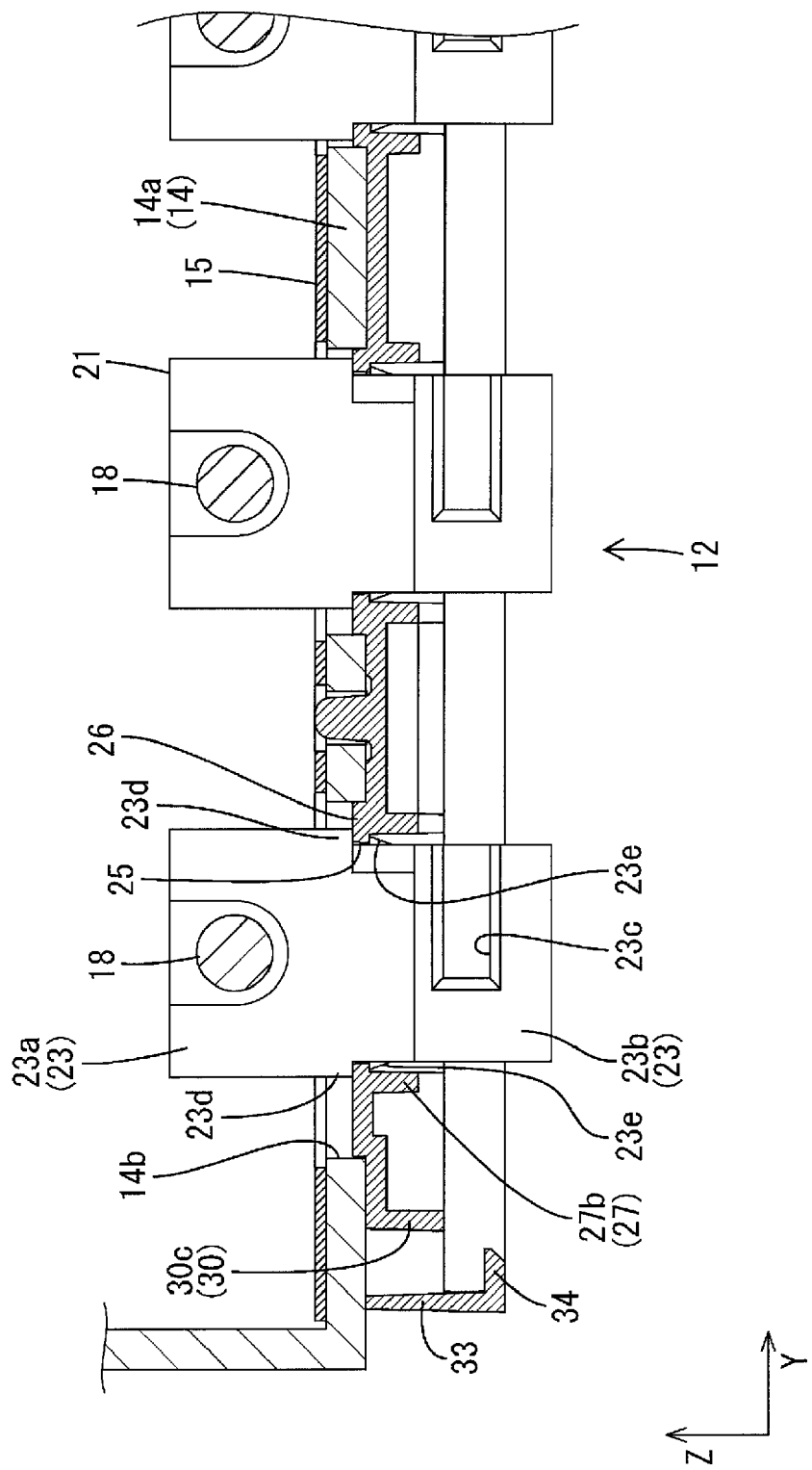
FIG. 10 is a cross-sectional view along line x-x in FIG. 6.

Next, the relay connectors 21 will be explained. As illustrated in FIG. 7, each relay connector 21 includes a housing 23 and the terminal 24. The housing 23 is made of synthetic resin having insulation properties and an overall shape thereof is a block-like shape. The terminal 24 is housed in the housing 23. Each relay connector 21 is passed through the bottom plate 14a of the chassis 14 and a cover 22, which will be explained later, and mounted. A part of the housing 23 inside the chassis 14 is a light source holding portion 23a that holds the end of the cold cathode tube 18. A part of the housing 23 outside the chassis 14 is a board holding portion 23b that holds the connector connecting portion 20c of the inverter board 20. The light source holding portion 23a has a round groove corresponding to a shape of the end of the cold cathode tube 18 (see FIG. 10). The board holding portion 23b has the board holding hole 23c that extends along the X-axis direction and the Y-axis direction. The board holding hole 23c opens to the rear (toward the inverter board 20) and to the right in FIG. 10. As illustrated in FIG. 10, the housing 23 is directly held by the cover 22 mounted to the chassis 14. Specifically, the light source holding portion 23a has a larger Y-axis dimension than that of the board holding portion 23b, and a wide portion 23d is held against the cover 22 from the front. The board holding portion 23b includes stoppers 23e that are held against the cover 22 from the rear.

As illustrated in FIG. 7, ends of the terminals 24 in the light source holding portions 23a are light source contact portions 24a that are in contact with the outer leads 18b of the cold cathode tubes 18. Ends of the terminals 24 in the board holding portions 23b are board contact portions 24b that are in contact with the terminals 20d of the connector connecting portions 20c. Each light source contact portion 24a and each board contact portion 24b have resilience and thus are elastically in contact with the outer lead 18b and the terminal 20d, respectively. An output voltage of the inverter board 20 is applied to the outer leads 18b and the electrodes of the cold cathode tubes 18 via the relay connectors 21.

As illustrated in FIG. 4, the relay connectors 21 are arranged in parts of the chassis 14 corresponding to the ends of the cold cathode tubes 18. Namely, they are arranged ends of the long dimension of the bottom plate 14a in pairs. Moreover, a plurality of them (corresponding to the number of the cold cathode tubes 18) are arranged along the short sides of the bottom plate 14a (along the Y-axis direction, an arrangement direction in which the cold cathode tubes 18 are arranged parallel to each other). Arrangement intervals of the relay connectors 21 are substantially equal to arrangement intervals of the cold cathode tubes 18. The Y-axis positions of the relay connectors 21 are substantially aligned with those of the cold cathode tubes 18.

Next, the covers 22 will be explained. Each cover 22 is made of synthetic resin having insulation properties. As illustrated in FIG. 2, the cover 22 is placed between the bottom plate 14a of the chassis 14 and the inverter board 20 (i.e., sandwiched therebetween). It protects the wiring patterns and the chip components 20b on the inverter board 20 from directly touching the bottom plate 14a. The covers 22 are mounted to the rear surface of the bottom plate 14a of the chassis 14 (the surface away from the cold cathode tubes 18) at the ends of the long dimension of the bottom plate 14a in pairs. They cover the areas of the bottom plate 14a in which the relay connectors 21 are arranged.

Figure 5:
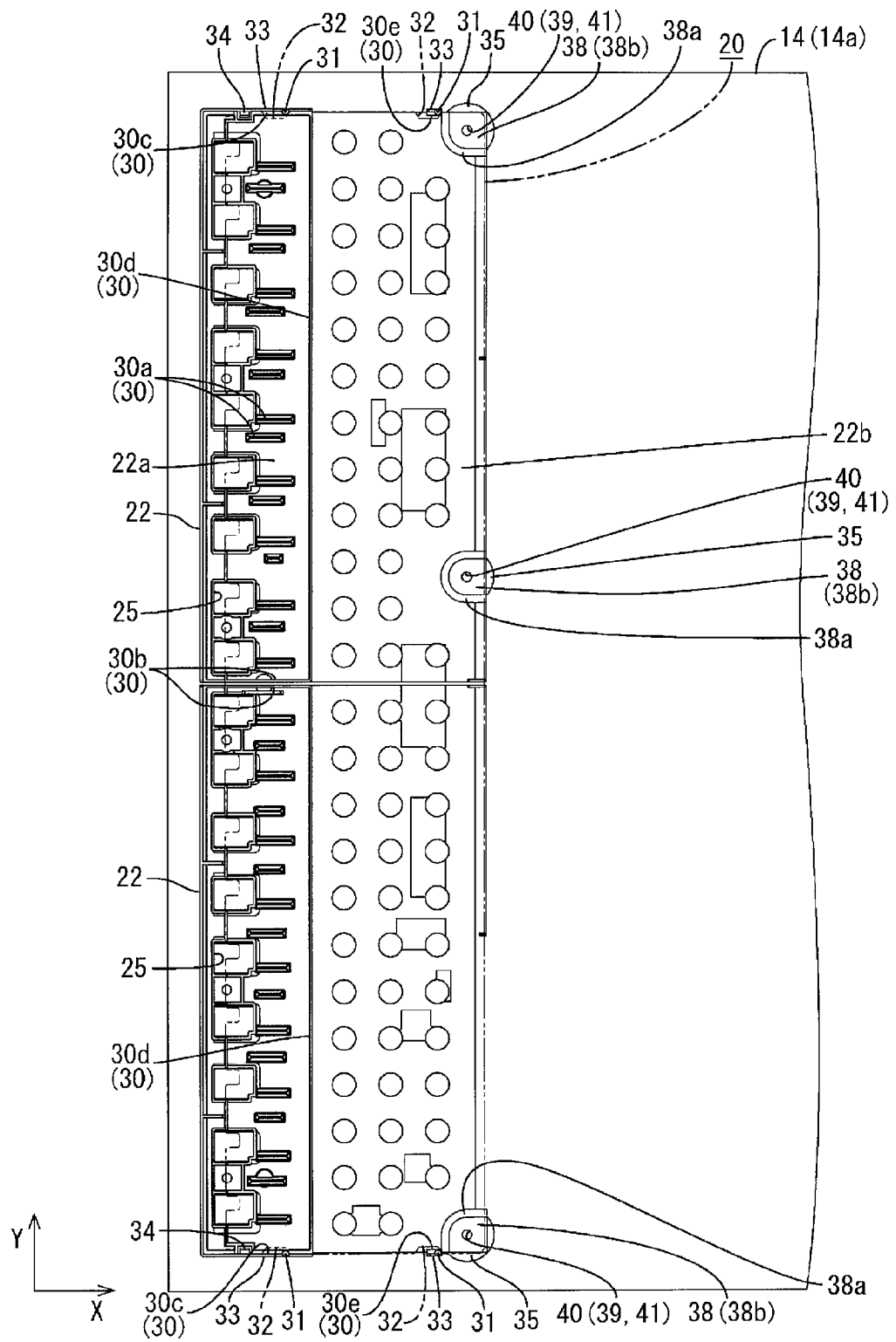
FIG. 5 is a magnified bottom view of the chassis with a cover mounted thereto.

Specifically, as illustrated in FIG. 5, each cover 22 has a rectangular plan-view shape. The covers 22 are arranged along the Y-axis direction and parallel to each other. The long-side direction thereof is aligned with the short-side direction of the bottom plate 14a. The covers 22 are fixed to the respective ends of the long dimension of the bottom plate 14a with screws. The long dimension of each cover 22 is about a half of the short dimension of the chassis 14 or the long dimension of the inverter board 20. The cover 22 has a plate-like shape and the board surface thereof is parallel to the bottom plate 14a of the chassis 14 and the board surface of the inverter board 20. A part of each cover 22 relatively close to the relay connectors 21 (or the end of the chassis 14) is a front portion 22a, and a part of each cover 22 relatively away from the relay connectors 21 (or close to the middle of the chassis 14) is a rear portion 22b. The rear portion 22b has heat dissipation holes that are through holes for dissipating heat and arranged in a matrix.

The front portion 22a of each cover 22 overlaps the area of the chassis 14, in which the relay connectors 21 are arranged, in plan view. The front portion 22a of the cover 22 has connector holes 25 that are through holes for receiving the relay connectors 21. Specifically, a plurality of the connector holes 25 are formed in the front portion 22a along the Y-axis direction so as to parallel to each other. Each connector hole 25 is formed so as to continue into the corresponding connector insertion hole 14b of the chassis 14. As illustrated in FIGS. 7 and 10, each connector hole 25 has a plan-view size, that is, X-axis size and Y-axis size smaller than those of the connector insertion hole 14b. The plan-view size of each connector hole 25 is substantially equal to an overall size of the relay connector 21. When the relay connector 21 is passed through the connector insertion hole 14b and the connector hole 25 and mounted, edges of the connector hole 25 are sandwiched between the wide portions 23d of the light source holding portions 23a and the stoppers 23e. Namely, the relay connector 21 is directly fixed to the cover 22 and indirectly fixed to the chassis 14. Clearances in predetermined X-axis size and Y-axis size are provided between the relay connector 21 and edges of the connector insertion hole 14b of the bottom plate 14a of the chassis 14. A holding protrusion 26 is provided at the edges of each connector hole 25 of the cover 22. The holding protrusion 26 projects toward the front (toward the chassis 14) such that it is fitted in the connector insertion hole 14b. The holding protrusion 26 has a short tubular shape and closes the clearances (it is provided between the edges of the connector insertion hole 14b and the relay connector 21). The holding protrusion 26 separates the relay connector 21 from the edges of the connector insertion hole 14b to maintain proper isolation therebetween.

Figure 6:
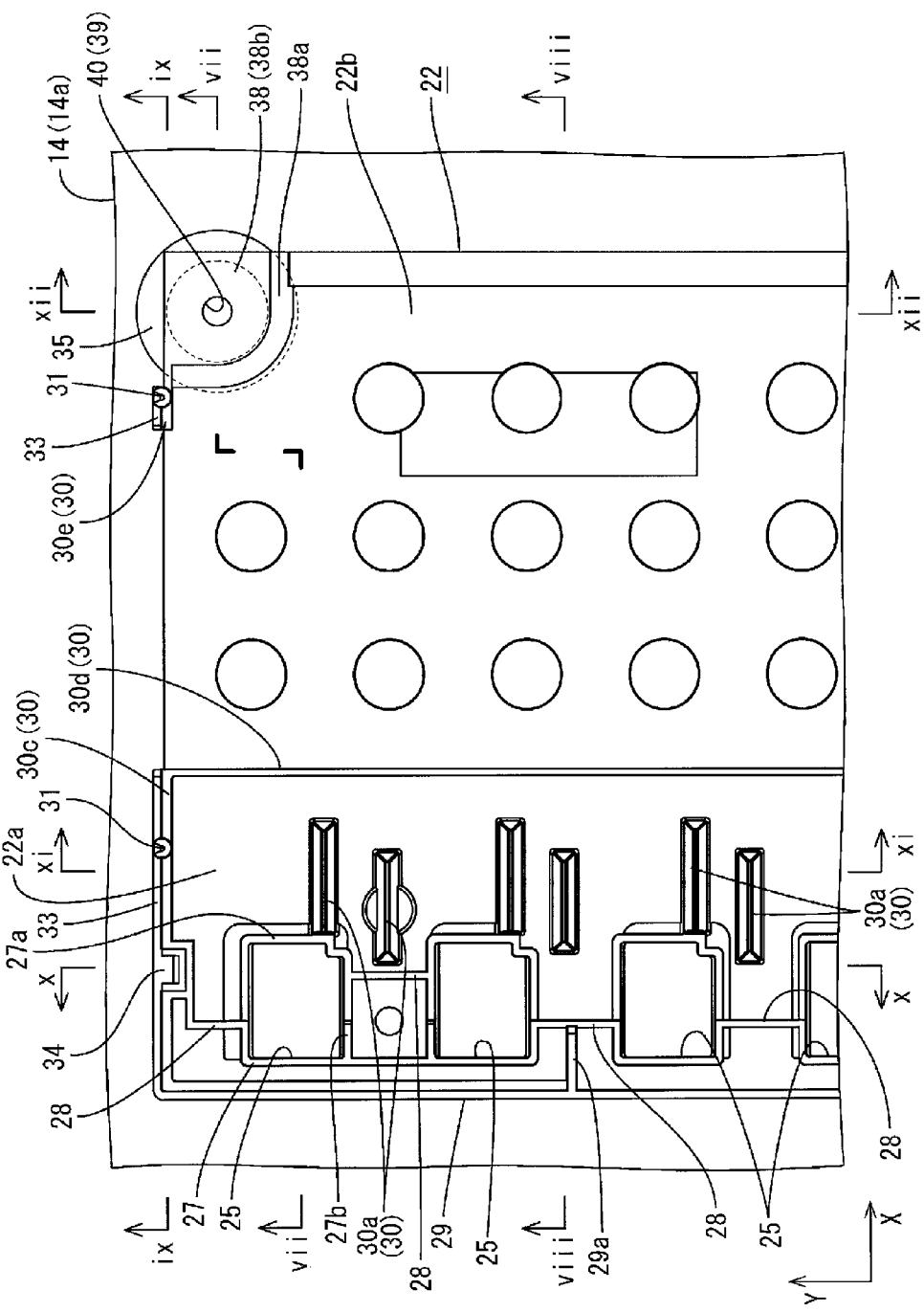
FIG. 6 is a magnified partial bottom view illustrating positioning structures of the cover.

As illustrated in FIG. 6, ribs 27 project from edges of the connector holes 25 in the front portion 22a of the cover 22 toward the rear (toward the inverter board 20). As illustrated in FIG. 7, each rib 27 has a short tubular shape with different heights in the front portion and the rear portion. The rear portion is a low portion 27a, the height of which is relatively low. The front portion is a high portion 27b, the height of which is relatively high. The height of the high portion 27b is defined such that a distal end surface thereof reaches the front surface of the inverter board 20 (the surface opposite the cover 22).

Figure 8:
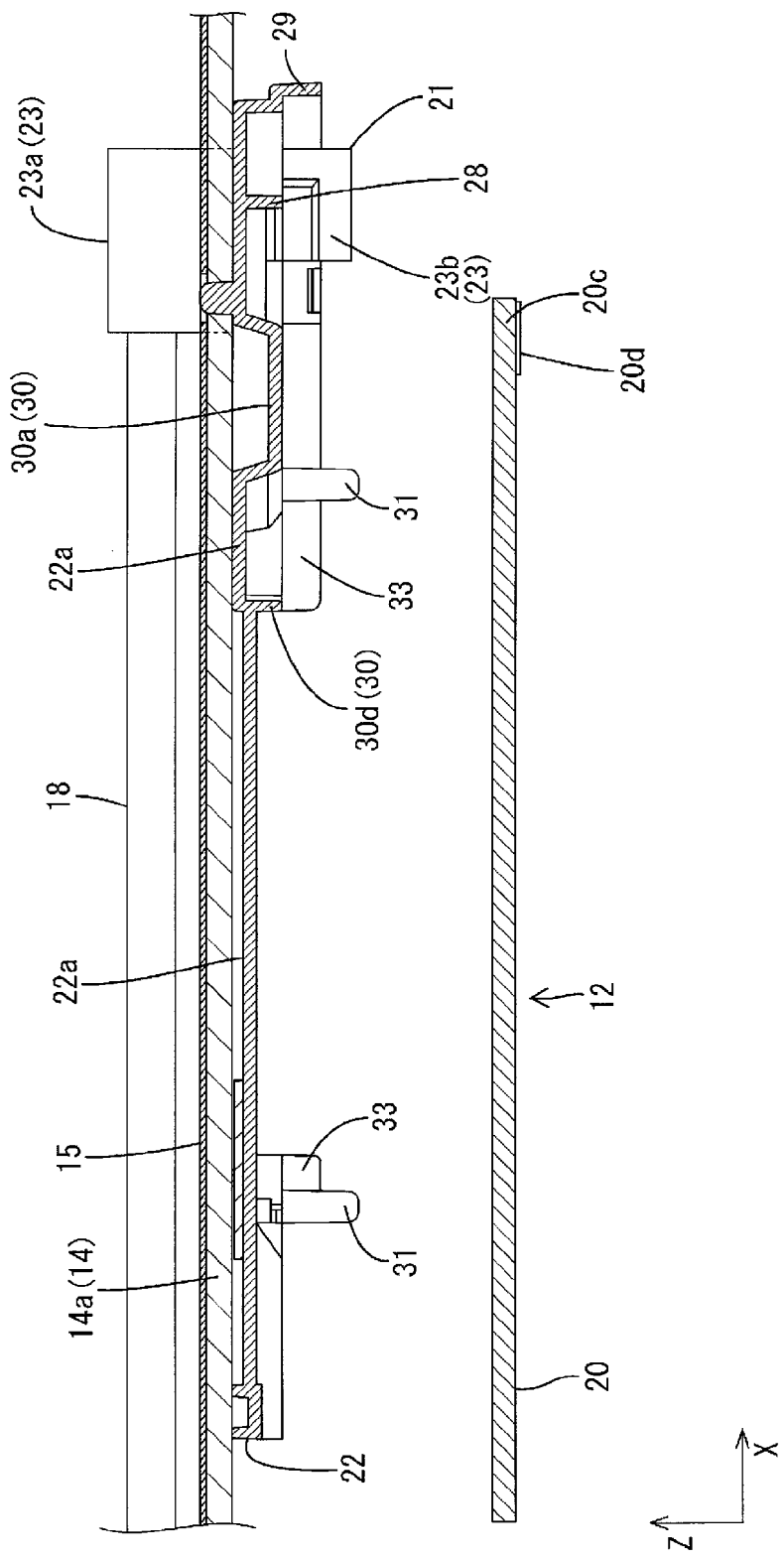
FIG. 8 is a cross-sectional view along line viii-viii in FIG. 6 with the inverter board at the removal position.

As illustrated in FIGS. 6 and 8, blocking portions 28 projects toward the rear. Each blocking portion 28 is arranged in an area between the adjacent connector holes 25. The blocking portions 28 are also arranged in areas between the connector holes 25 the closest to the respective ends with respect to the Y-axis direction and respective front vertical support walls 30b and 30c, which will be explained later. Each blocking portion 28 extends along the Y-axis direction. Specifically, each blocking portion 28 arranged in the area between the connector holes 25 extends continuously for an entire length of the area. It is connected to the ribs 27 formed at the edges of the connector holes 25. Each blocking portion 28 arranged between the connector hole 25 the closest to the end and the front vertical support wall 30b or 30c extends continuously for an entire length of the area. It is connected to the rib 27 formed at the edge of the connector hole 25 the closest to the end and to the front vertical support wall 30b or 30c. The blocking portion 28 has the height substantially equal to that of the high portion 27b of the rib 27. Therefore, the distal end surface of the front blocking portion 35a is in contact with the front surface of the connector connecting portion 20c of the inverter board 20 that is set at the connected position (see FIG. 19). Therefore, the front of the space between inverter board 20 that is at the connected position and the cover 22 is continuously blocked substantially without any openings. Therefore, foreign substances from the front can be properly blocked.

A front wall portion 29 projects from the front end portion of the front portion 22a of the cover 22 toward the rear and a distal end thereof is located higher than the high portion 27b of the rib 27. The front wall portion 29 extends along the Y-axis direction and a plurality of extending portions 29a that extend from a middle of the front wall portion 29 to the rear. The extending portions 29a are connected to the blocking portions 28 and in contact with the front end surface of the inverter board 20 at the connected position.

As illustrated in FIGS. 5 to 11, each cover 22 has a plurality of board support portions 30 that project toward the front and support the inverter board 20 from the rear. The board support portions 30 can restrict a deformation including a warp of the inverter board 20 . The board support portions 30 include a plurality of support projections 30a, a pair of the front vertical support walls 30b and 30c, a horizontal support wall 30c, and a rear vertical support wall 30e. The support projections 30a are arranged adjacent to the respective connector holes 25 in the front portion 22a of the cover 22. The front vertical support walls 30b and 30c are arranged at the ends of the long dimension (along the Y-axis direction) of the cover 22. The horizontal support wall 30d is connected between the vertical support walls 30b and 30c. The rear support wall 30e is arranged at one of the ends of the long dimension of the rear portion 22b of the cover 22. The support projections 30a, the vertical support wall 30b and 30c, the horizontal support wall 30c, and the rear vertical support wall 30e have heights similar to those of the high portions 27b of the ribs 27 and the blocking portions 28. They are in contact with the front surface of the inverter board 20.

Figure 11:
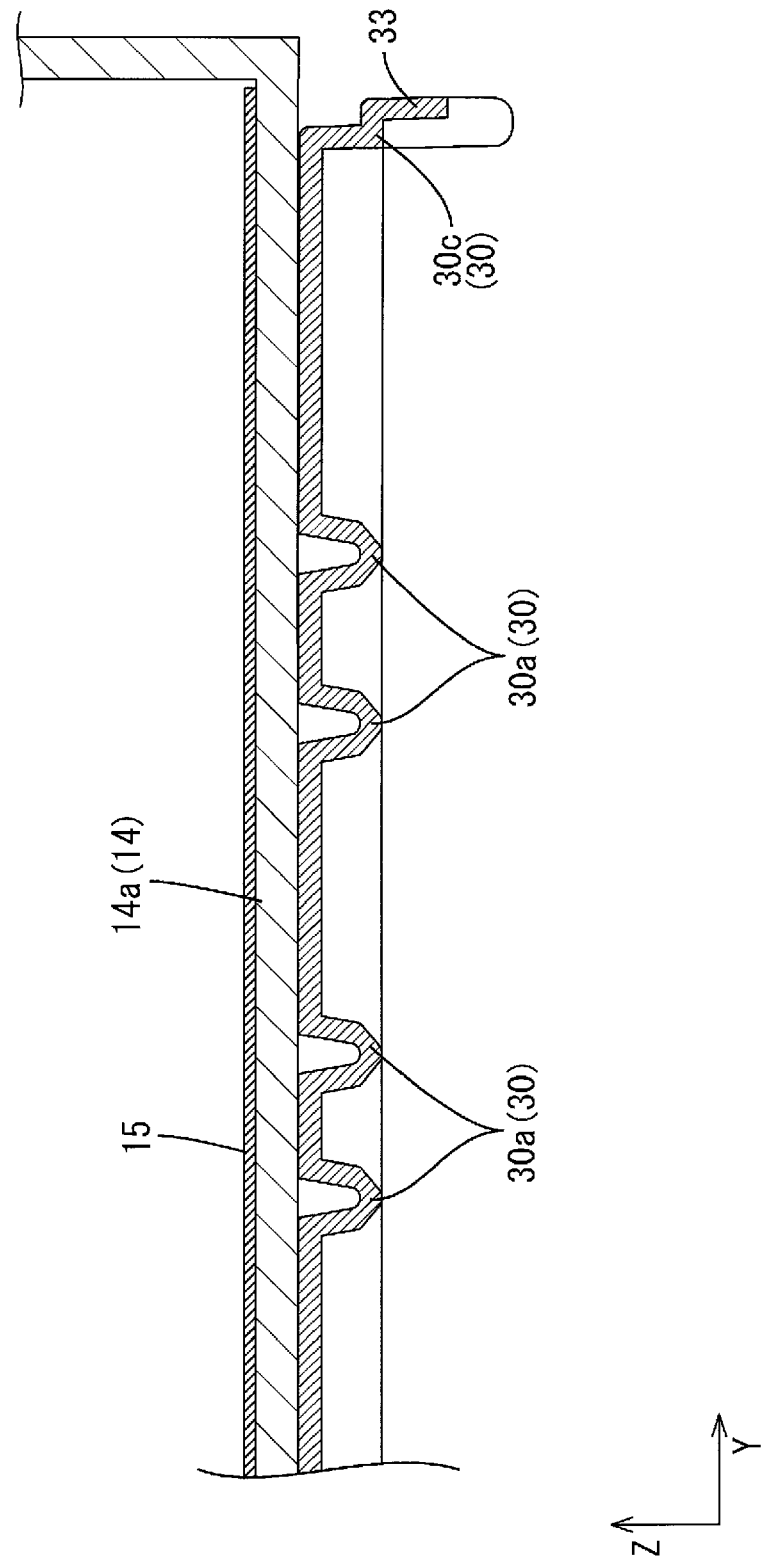
FIG. 11 is a cross-sectional view along line xi-xi in FIG. 6.

As illustrated in FIGS. 6 and 8, each support projection 30a extends along the X-axis direction (the connecting direction). A plurality of the support projections 30a are arranged along the Y-axis direction so as to be parallel to each other. For most of the connector holes 25, two support projections 30a are provided for each connector hole 25. Some of the support projections 30a are connected to the low portions 27a of the ribs 27. As illustrated in FIGS. 8 and 11, each support projection 30a is formed by projecting a part of the front portion 22a of the cover 22 to the front. The outer surfaces of the support projection 30a are tapered surfaces that are tapered at two different angles. The support projection 30a supports a part of the inverter board 20 immediately rear of the connector connecting portion 20c that is inserted in the relay connector 21 (see FIG. 19).

Figure 9:
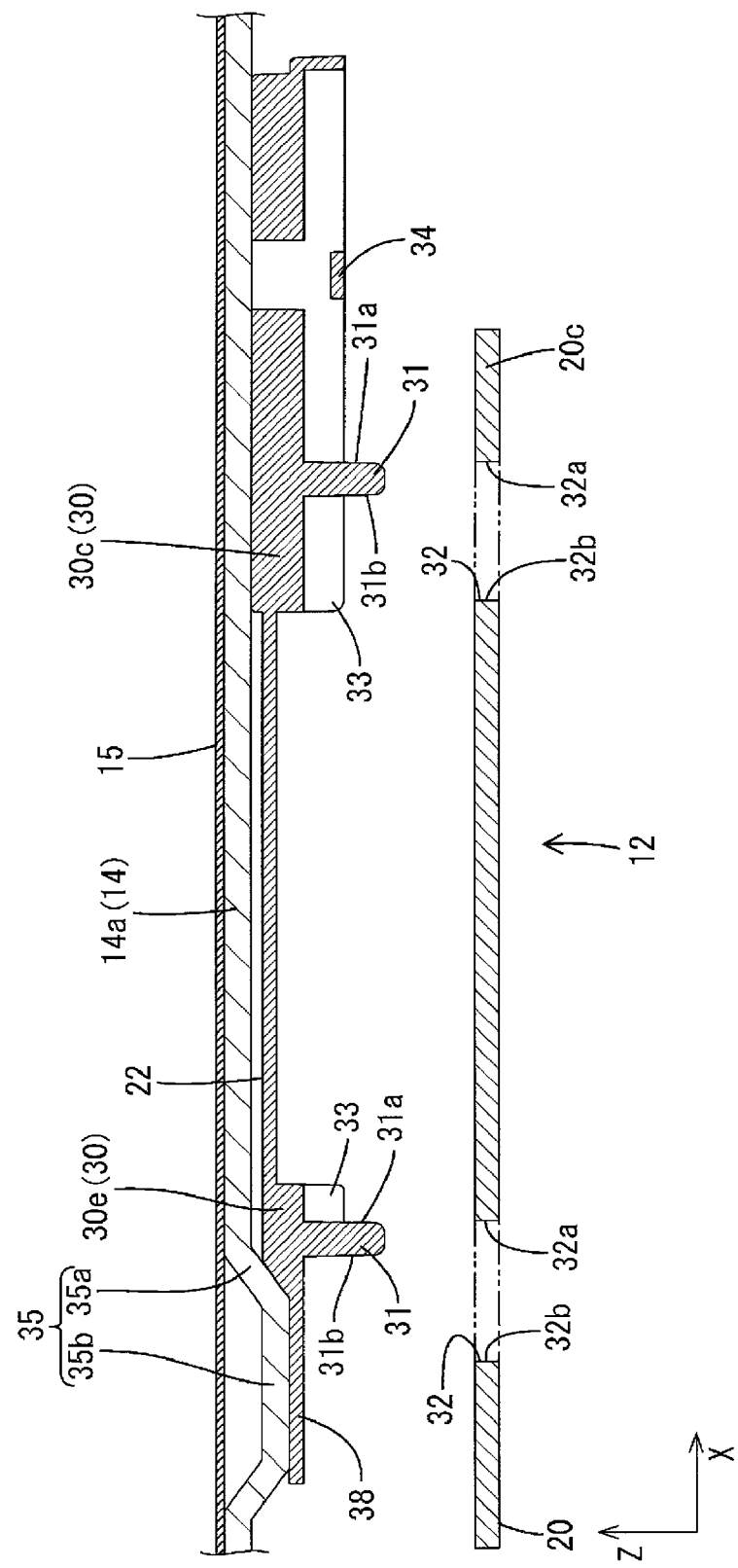
FIG. 9 is a cross-sectional view along line ix-ix in FIG. 6 with the inverter board at the removal position.

As illustrated in FIGS. 5 and 9, the front vertical support walls 30b and 30c are arranged at the ends of the long dimension of the front portion 22a of the cover 22 so as to extend along the X-axis direction. When the cover 22 is mounted to the chassis 14, the front vertical support wall 30b and 30c are located around the center of the short dimension of the chassis 14 and the end of the short dimension of the chassis 14, respectively. Namely, they are distinguished from each other as the center vertical support wall 30b and the end vertical support wall 30c. The center vertical support wall 30b supports the central area of the front end portion of the inverter board 20 with respect to the long-side direction. The end vertical support wall 30c supports the end area of the front end portion of the inverter board 20 with respect to the long-side direction. As illustrated in FIG. 5, the horizontal support wall 30d is arranged more to the rear than the support projections 30a so as to extend along the Y-axis direction. The horizontal support wall 30d supports the inverter board from the rear side at that position.

As illustrated in FIGS. 6 and 9, the rear vertical support wall 30e is located at the end of long dimension of the rear portion 22b of the cover 22 so as to extend along the X-axis direction. The end corresponds to the end of the short dimension of the chassis 14 when the cover 22 is mounted to the chassis 14. The rear vertical support wall 30e is located slightly more to the front than the cutout at the corner of the rear portion 22b of the cover 22. The rear vertical support wall 30e is a sufficient distance away from the front end vertical support wall 30c. The rear end vertical support wall 30e supports the end of the inverter board 20 with respect to the long-side direction. Namely, the ends of the inverter board 20 are supported by the end vertical support walls 30c and the rear vertical support walls 30e at positions away from each other in the front-rear direction.

The support projections 30a, the center vertical support walls 30b and the horizontal support walls 30d of the board support portion 30 form a middle area support structure. The end vertical support walls 30c and the rear vertical support walls 30e form an end area support structure. As illustrated in FIG. 5, the middle area support structure supports the middle area of the inverter board 20 with respect to the long-side direction (the Y-axis direction, the second direction perpendicular to the first direction that is along the connecting direction). Furthermore, the end area support structure supports the end areas of the inverter board 20 with respect to the long-side direction of the inverter board 20. The board support portion 30 supports the inverter board 20 whether the inverter board 20 is at the non-connected position or at the connected position. It also supports the inverter board 20 during the movement of the inverter board 20 between those two positions.

This embodiment includes the fixing structures for fixing the inverter boards 20 to the chassis 14. As illustrated in FIG. 7, each fixing structure includes the receiving portion 35 of the chassis 14 for receiving the inverter board 20 and the spacer portion of the cover 22 arranged between the inverter board 20 and the receiving portion 35. The fixing structure further includes a bolt 36 and a nut 37 (see FIGS. 18 and 23). The inverter board 20 is in contact with the spacer portion 38 but not with the receiving portion 35. The inverter board 20 is indirectly supported by the receiving portion 35. The fixing member will be explained in detail below.

As illustrated in FIGS. 7 and 12, the receiving portion 35 is formed by protruding a part of the bottom plate 14a of the chassis 14 to the rear, that is, toward the inverter board 20. The inverter board 20 is supported by the receiving portion 35 at a position a predetermined distance away from the bottom plate 14a. The receiving portion 35 is formed integrally with the chassis 14 by drawing a part of the bottom plate 14a. Namely, the receiving portion 35 is made of the same metal material as that of the chassis 14. The receiving portion 35 has a circular truncated cone-like overall shape. Specifically, the receiving portion 35 includes a wall 35a and a ceiling 35b. The wall 35a tapers toward a distal end thereof and angles relative to the bottom plate 14a. The ceiling 35b continues from the distal end of the wall 35 and extends parallel to the bottom plate 14a. The outer surface of the ceiling 35b is substantially flat on the X-Y plane, that is, parallel to the board surface of the inverter board 20. The outer surface of the ceiling 35b is a receiving surface on which the inverter board 20 is placed from the front side. The ceiling 35b has a mounting hole 39 that is a through hole through which the bolt 35 is passed (see FIGS. 18 and 23). The bolt 35 is a mounting member. The mounting hole 39 is substantially round in plan view with a diameter is slightly larger than an outer diameter of a shaft of the bolt 35. The nut 36 that is placed on the front side and housed in the receiving portion 35 is threaded onto the bolt 35 that is passed through the mounting hole 39.

As illustrated in FIG. 5, three receiving portions 35 are provided in an area of the bottom plate 14a of the chassis 14 overlapping the cover 22 and the inverter board 20 that is at the connected position. They are arranged substantially on a straight line along the Y-axis direction. Specifically, the receiving portions 35 are arranged more to the center of the bottom plate 14a (or the inverter board 20) than the relay connectors 21 with respect to the X-axis direction, that is, in an area corresponding to the rear end portion of the cover 22. Furthermore, two of them are arranged at the respective ends of the bottom plate 14a with respect to the Y-axis direction and one of them is arranged close to the center of the bottom plate 14a with respect to the Y-axis direction. Upper two of the receiving portions 35 in FIG. 5 are arranged around the respective ends of the long dimension of the upper cover 22 (along the Y-axis direction) in FIG. 5. The lower receiving portion 35 in FIG. 5 is arranged around the lower end of the lower cover 22 in FIG. 5.

Next, the spacer portions 38 will be explained in detail. Each spacer portion 38 is formed integrally with the cover 22 and thus made of the same synthetic resin as that of the cover 22. As illustrated in FIGS. 5, 7, and 12, the spacer portions 38 are arranged in areas of the cover 22 overlapping the respective receiving portions 35 in plan view. Each spacer portion 38 is formed in a shape corresponding to the receiving portion 35, that is, a part of the cover 22 protrudes to the rear side toward the inverter board 20. The receiving portions 35 are fitted in the respective spacer portions 38 from the front side.

As illustrated in FIGS. 7 and 12, each spacer portion 38 includes a wall 38a and a ceiling 38b connected to each other. The wall 38a is angled relative to the cover 22 and parallel to the wall 35a of the receiving portion 35. The ceiling 38b is parallel to the cover 22 and the ceiling 35b of the receiving portion 35. When the walls 38a are brought into contact with the walls 35a of the respective receiving portion 35, the cover 22 is positioned relative to the chassis 14 with respect to the X-axis direction and the Y-axis direction. Outer surfaces of the ceilings 38b are substantially flat with the X-Y-plane, that is, parallel to the board surface of the inverter board 20. The outer surfaces are contact surfaces that are in contact with the inverter board 20. The contact surfaces are substantially flat with the contact surfaces of the board support portions 30 (the support projections 30a, the front vertical support walls 30b and 30c, the horizontal support walls 30d, and the rear vertical support walls 30e). The contact surfaces of the board support portions 30 are in contact with the inverter board 20 in the Z-axis direction. Each ceiling 38b has a mounting hole 40 that is a through hole through which the bolt 35 is passed (see FIGS. 18 and 23). The mounting hole 40 has similar shape and diameter to those of the mounting hole 39 of the receiving portion 35. The mounting holes 39 and 40 are aligned with each other so as to continue from one another.

The upper cover 22 and the lower cover 22 in FIG. 5 have two spacer portions 38 and one spacer portion 38, respectively. The spacer portions 38 are arranged at the rear ends of the rear portions 22b of the covers 22 with respect to the X-axis direction. One of the spacers 38 of the upper cover 22 in FIG. 5 is arranged around the end of the bottom plate 14a of the chassis 14 (or the inverter board 20) with respect to the Y-axis direction. The other spacer portion 38 of the upper cover 22 is arranged closer to the center than the end of the upper cover 22 located around the center of the bottom plate 14a with respect to the Y-axis direction. The spacer portion 38 of the lower cover 22 in FIG. 5 is arranged at the end of the lower cover 22 corresponding to the end of the chassis 14 with respect to the Y-axis direction. The wall 38a of each of the spacer portions 38 at the ends of the chassis 14 has an L-like shape in plan view. The wall 38a of the spacer portion 38 near the center of the chassis 14 has a U-like shape.

Figure 18:
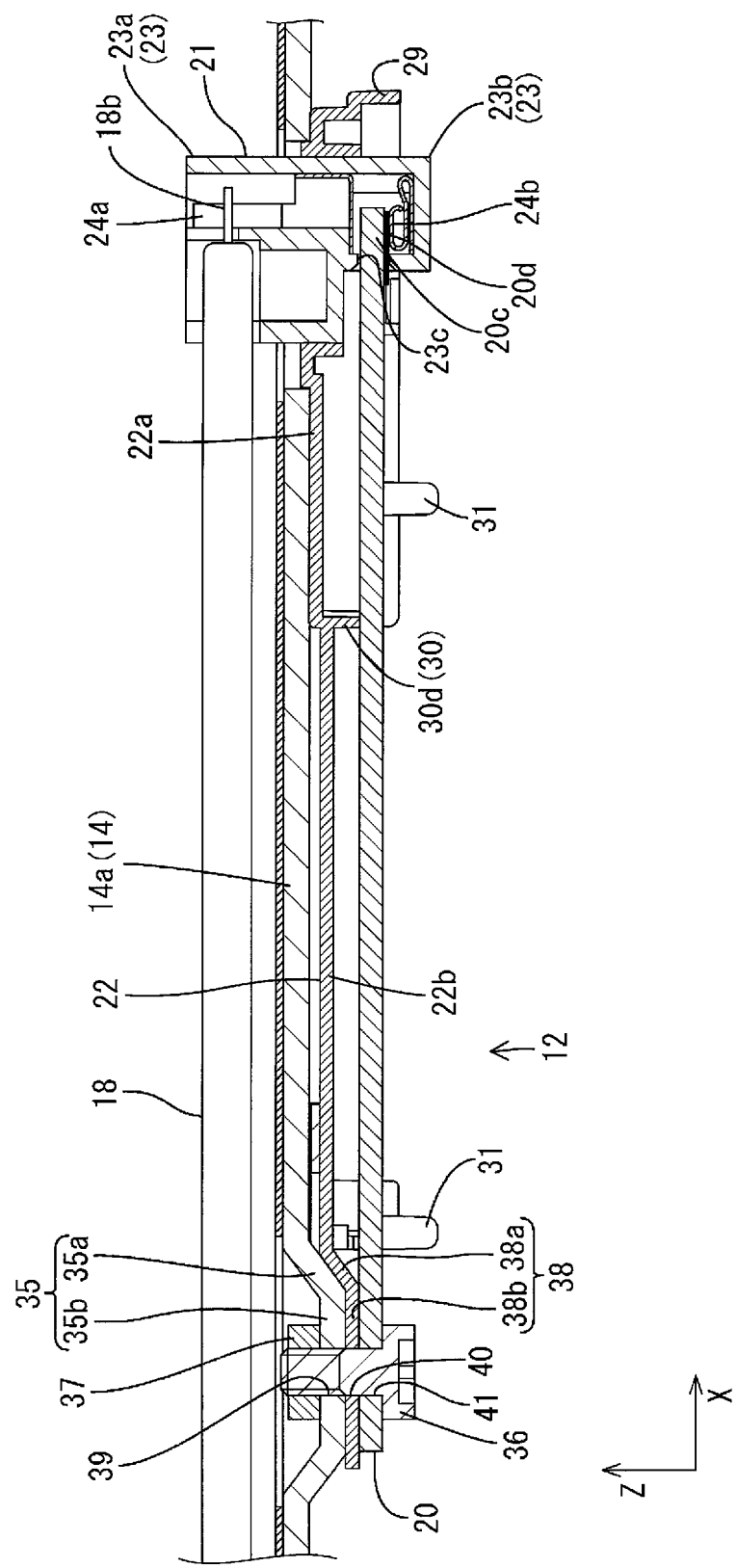
FIG. 18 is a cross-sectional view along line xviii-xviii in FIG. 17 with the inverter board at the connected position.

As illustrated in FIG. 18, the height of each spacer portion 38 from the cover 22 is substantially equal to a distance between the cover 22 and the inverter board 20 that is at the connected position. The distance between the cover 22 and the inverter board 20 that is at the connected position is substantially equal to an addition of the height of the receiving portion 35 from the chassis 14 and the thickness of the ceiling 38b of the spacer portion 38. Namely, the height of the receiving portion 35 from the chassis 14 is smaller than the distance between the chassis 14 and the inverter board 20 by the thickness of the spacer portion 38 that is arranged between the chassis 14 and the inverter board 20.

The inverter board 20 has holes 41 that continue into the mounting holes 39 of the respective receiving portions 35 and the mounting holes 40 of the respective spacer portions 38. As illustrated in FIG. 5, three holes 41 are formed in the rear end portion of the inverter board 20 on a straight line along the Y-axis direction. Two of the holes 41 are arranged at the respective ends of the inverter board 20 and one of the three holes 41 is arranged close to the center of the inverter board 20 with respect to the Y-axis direction. Each hole 41 has a shape and a diameter substantially the same as those of the mounting holes 39 and 40. The holes 41 are aligned with the mounting holes 39 of the respective receiving portions 35 and the mounting holes 40 of the respective spacer portion 38, and continue into them only when the inverter board 20 is set at the connected position (see FIGS. 17, 18, and 23). When the holes 41 are aligned with the respective mounting holes 39 and 40, the bolts 36 can be passed through. However, the bolts 36 cannot be passed through when the holes 41 are not aligned with the mounting holes 39 and 40.

To connect the inverter board to the relay connectors 21, the inverter board 20 is moved from non-connected position to the connected position while the relative position thereof to the chassis 14 and the cover 22 with respect to the Z-axis direction is maintained. On the surfaces of the inverter board 20 facing the chassis 14 or the cover 22, the chip components 20b are mounted. Moreover, the leads of the lead components 20a project from those surfaces. If the inverter board 20 is displaced relative to the X-axis direction and the Y-axis direction during setting of the inverter board 20 to the non-connected position, the chip components 20b or the leads may touch the parts of the chassis 14 or the cover 22. Furthermore, if the inverter board 20 is displaced from the non-connected position, the same problem may occur when it is moved from the non-connected position to the connected position.

In this embodiment, the cover 22 and the inverter board 20 mounted to the chassis 14 have positioning structures for positioning the cover 22 and the inverter board 20 relative to each other along the board surface directions thereof (the X-axis direction and the Y-axis direction). Two kinds of the positioning structures are provided for different directions in which the inverter board 20 is positioned. The positioning structures for positioning the inverter board 20 in the X-axis direction (the first direction) along the connecting direction of the inverter board 20 are the first positioning structures. The positioning structures for positioning the inverter board 20 in the Y-axis direction (the second direction) perpendicular to the X-axis direction are the second positioning structures. The first positioning structures and the second positioning structures are provided at the ends of the Y-axis dimensions of the chassis 14 and the inverter board 20.

As illustrated in FIGS. 5 and 9, the first positioning structures include the first positioning protrusions 31 and the first positioning recesses 32. The first positioning protrusions 31 are provided on the cover 22 that is located on the chassis 14 side. The first positioning recesses 32 are provided in the inverter board 20 for receiving the first positioning protrusions 31. The first positioning protrusions 31 project from the second blocking portions 36 of the cover 22 toward the rear (toward the inverter board 20). Two pairs of first positioning protrusions 31 and a total of four first positioning protrusions 31 are provided. The first positioning protrusions 31 in each pair are arranged at the respective ends of the short dimension of the chassis 14 (along the Y-axis direction). As illustrated in FIGS. 6 and 9, the first positioning protrusions 31 are located more to the rear than the connector holes 25. Each first positioning protrusion 31 has a columnar shape and the height larger than the thickness of the inverter board 20. As illustrated in FIG. 13, the first positioning recesses 32 are formed by cutting parts of the short edges (at the ends of the Y-axis dimension) of the inverter board 20. Namely, each first positioning recess 32 is formed by cutting the parts of the short edges of the inverter board 20 located at slightly more to the rear than the front edge of the inverter board 20. Each first positioning recess 32 extends through the inverter board 20 in the thickness direction and opens outward. Each first positioning recess 32 is in a trapezoidal plan-view shape and the width thereof (the X-axis dimension) increases toward the opening-end corresponding to the outer edge of the Y-axis dimension. A front edge 32a and a rear edge 32b of each first positioning recess 32 are tapered.

Figure 17:
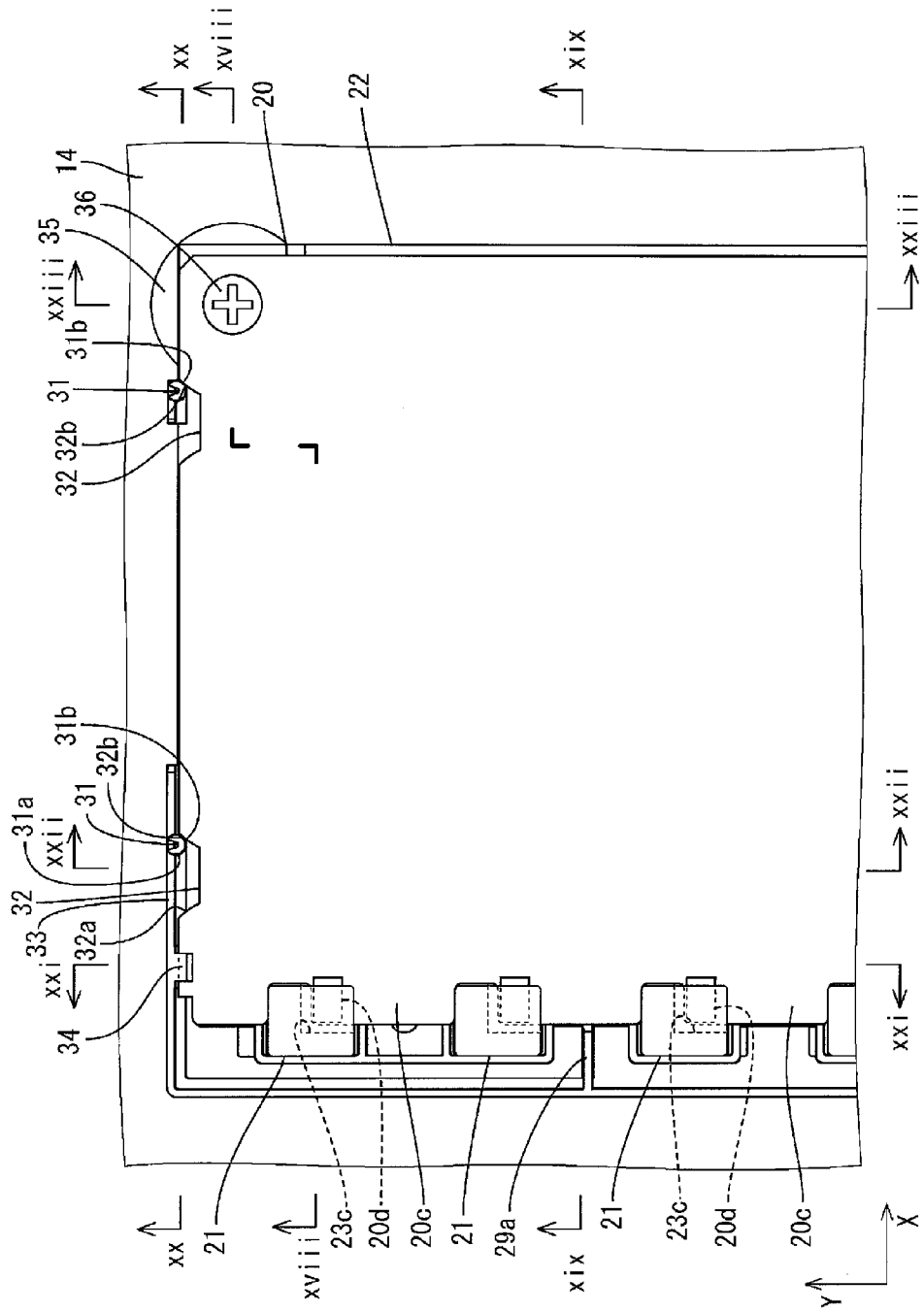
FIG. 17 is a magnified partial bottom view with the inverter board at the connected position.

Furthermore, each first positioning recess 32 has the X-axis dimension larger than the diameter of the first positioning protrusion 31. When the first positioning protrusion 31 is inserted in the first positioning recess 32, clearances are provided between the first position protrusions 31 and the edges of the first positioning recess 32 with respect to the X-axis direction. The first positioning protrusion 31 can be moved relative to the first positioning recess 32 in the front-rear direction within a range corresponding to the clearances. The first positioning protrusion 31 hits the front edge 32a or the rear edge 32b of the first positioning recess 32 and thus the relative movement of the first positioning protrusion 31 is restricted. When the inverter board 20 is at the non-connected position, the front end portions 31a of the first positioning protrusions 31 are in contact with the front edges 32a of the respective first positioning recesses 32 as illustrated in FIG. 13. Therefore, the inverter board 20 does not move from the non-connected position to the rear. When the inverter board 20 is at the connected position, the rear end portion 31b of the first positioning protrusions 31 are in contact with the rear edges of the respective first positioning recesses 32 as illustrated in FIG. 17. Therefore, the inverter board 20 does not move from the connected position to the front. The clearance between each first positioning protrusion 31 and the edge of the corresponding first positioning recess 32 is substantially equal to the distance between the non-connected position and the connected position of the inverter board 20.

Next, the second positioning structures will be explained in detail. The second positioning structures include the second positioning parts 33. As illustrated in FIGS. 5 and 9, the second positioning parts 33 are arranged in end portions of each cover 20 near the ends of the short dimension of the chassis 14. Two pairs of second positioning parts 33 and a total of four second positioning parts 33 are provided. The second positioning parts 33 in each pair are arranged at the respective ends of the short dimension of the chassis 14 along the Y-axis direction so as to be away from each other in the front-rear direction. As illustrated in FIGS. 6 and 9, each second positioning part 33 includes a front positioning portion 33a and a rear positioning portion 33b. The front positioning portion 33a is located relatively front and connected to the second blocking portion 36 of the cover 22. The rear positioning portion 33b is located relatively rear and connected to the rear blocking portion 35b. The second positioning part 33 is a vertical wall that projects from the outer edges of the second blocking portion 36 and the rear blocking portion 35b toward the rear along the Z-axis direction, and extends along the X-axis direction. The thickness of the second positioning part 33 is about a half of the thickness of the second blocking portion 36. As illustrated in FIGS. 13 and 17, the inner walls of the second positioning parts 33 are in contact with the side surfaces of the inverter board 20 (including the side surface of the cutout 37 that will be explained later). A distance between the inner walls of the second positioning parts 33 opposite to each other and located at the ends of the Y-axis dimension of the chassis 14 is substantially equal to the long dimension of the inverter board 20 as illustrated in FIG. 5. Therefore, the inverter board 20 is not displaced from the non-connected position or the connected position in the Y-axis direction. During the movement of the invert board 20 from the non-connected position to the connected position, the side surfaces of the inverter board 20 slide over the inner walls of the second positioning parts 33. Namely, the movement of the inverter board 20 is guided. The height of each second positioning part 33 is smaller than that of the first positioning protrusion 31.

Each cover 22 in this embodiment includes board stoppers 34 in addition to the above positioning structures. The board stoppers 34 hold the inverter board 20 from the rear (from a side opposite from the chassis 14). As illustrated in FIGS. 6, 9 and 10, each board stopper 34 projects inward from the second positioning part 33 of the cover 22 along the Y-axis direction (i.e., toward the middle of the short dimension of the chassis 14). The board stopper 34 is arranged near the front end portion of the second positioning part 33, specifically, in an area that overlaps the connector hole 25 in the X-axis direction. The inner surface of the board stopper 34 is in contact with the rear surface of the inverter board 20. The board stopper 34 is not in contact with the inverter board 20 when the inverter board 20 is at the non-connected position (see FIG. 16). It is in contact with front end portion of the inverter board 20 when the inverter board 20 is at the connected position (see FIG. 20). With this configuration, the inverter board 20 at the connected position is less likely to deform in a direction that crosses the board surface of the inverter board 20.

This embodiment has the above configuration. Next, functions of this embodiment will be explained. The liquid crystal panel 11 and the backlight unit 12 prepared separately are fixed together by the bezel 13, and the liquid crystal display device having the above configuration is prepared. Assembly of the backlight unit 12 will be explained.

In the assembly of the backlight unit 12, the reflection sheet 15 is placed over the front inner surface of the chassis 14 and the covers 22 are attached to the rear outer surface of the chassis 14. During the attachment of each cover 22, the spacer portion 38 of the cover 22 is positioned relative to the receiving portion 35 of the chassis and then the cover 22 is mounted to the bottom plate 14a. When the spacer portion 38 is fitted in the receiving portion 35, the cover 22 is positioned relative to the chassis 14 with respect to the X-axis direction and the Y-axis direction. The relay connectors 21 are mounted to the chassis 14 from the inner side of the chassis 14 and fitted in the connector holes of the covers 22. The relay connectors 21 are held by the covers 22. Then, the cold cathode tubes 18 are installed in the chassis 14. The outer leads 18b at the ends thereof are inserted in the light source holding portions 23a of the relay connectors 21 so as to elastically in contact with the light source contacts 24a of the terminals 24. The holders 19, the optical members 16 and the frame 17 are mounted to the chassis 14 from the front (see FIG. 2).

On the rear surface of the chassis 14, the inverter boards 20 are mounted to the chassis 14 and the covers 22. The inverter boards 20 are moved close to the chassis 14 and the covers 22 from the non-connected positions illustrated in FIGS. 7 to 9 with the surfaces on which the wiring patterns and the chip components 20b are provided on the front side. The inverter boards 20 are moved from the rear side toward the chassis 14 and the covers 22 along the Z-axis direction until they are set to the non-connected positions illustrated in FIGS. 13 to 16. By positioning the first positioning protrusions 31 of each cover 22 to the respective first positioning recesses 32 at the ends of the Y-axis dimension of each inverter board 20, the inverter board 20 is properly set to the connected position with respect to the X-axis (see FIG. 5). The position of inverter board 20 is adjusted with respect to the X-axis direction such that the front end portion 31a of the first positioning protrusions 31 and the front end portion 33ba of the rear positioning portion 33b of the cover 22 on the chassis 14 side are in contact with the respective front edges 32a of the first positioning recesses 32 and a front end wall 37a of each cutout 37 arranged near the four corners of each inverter board 20. As a result, the inverter board 20 is positioned with respect to the X-axis direction at two positions away from each other in the front-rear direction. Therefore, the relative positions between the first positioning protrusions 31 and the first positioning recesses 32 can be easily visually confirmed.

Figure 14:
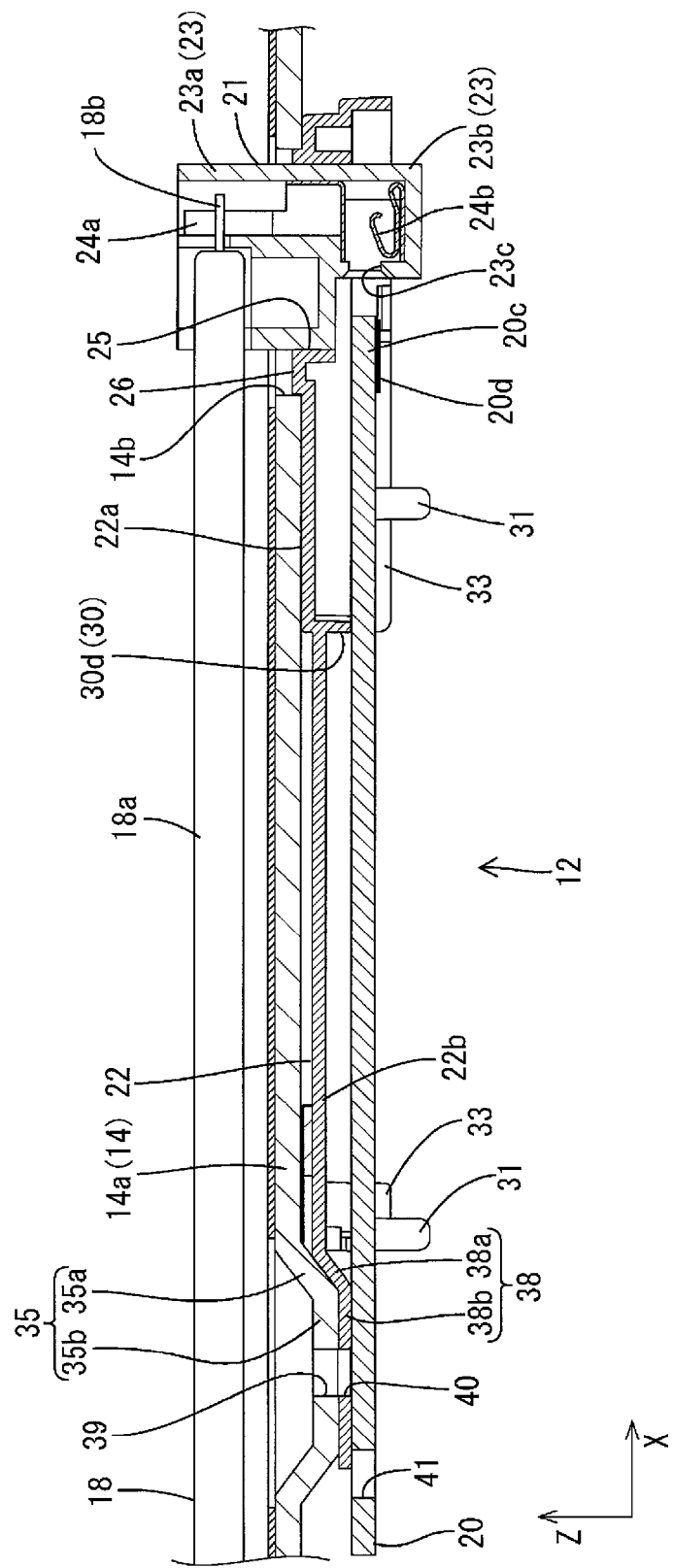
FIG. 14 is a cross-sectional view along line xiv-xiv in FIG. 13 with the inverter board at the non-connected position.
Figure 15:
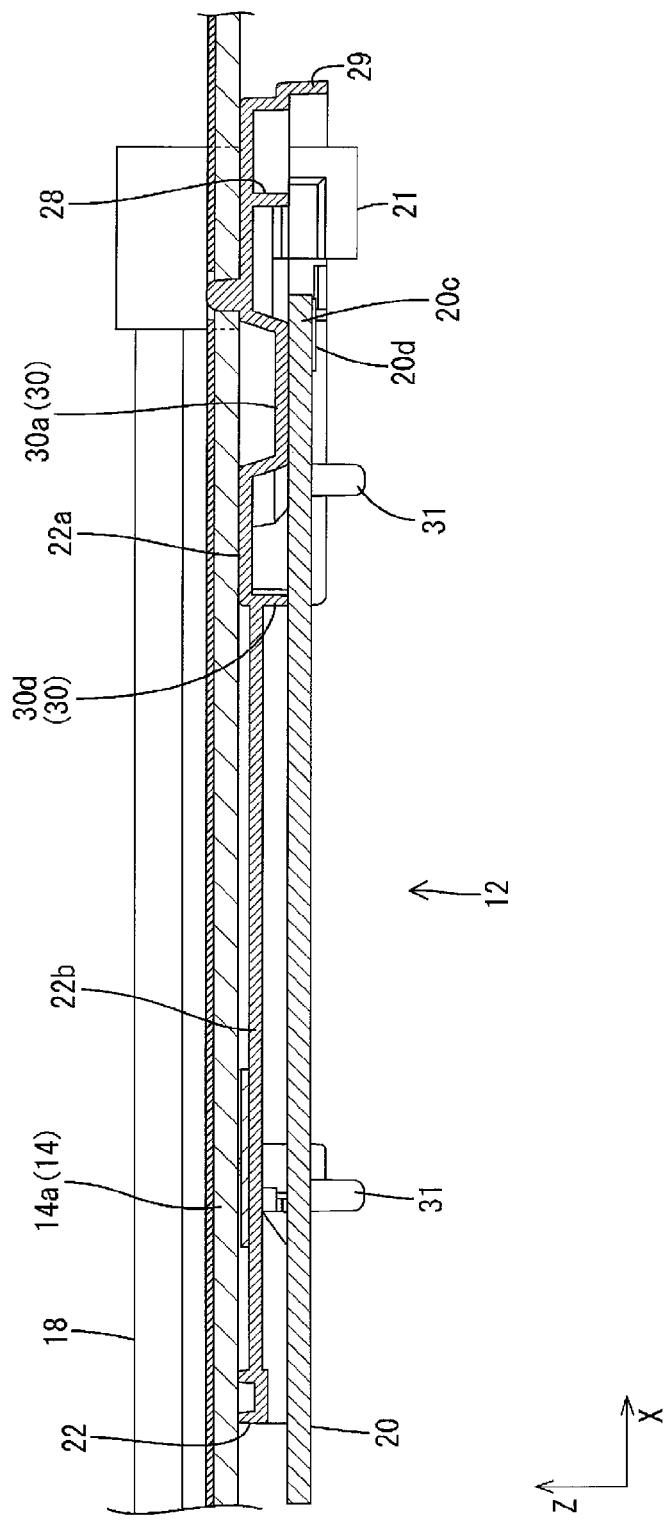
FIG. 15 is a cross-sectional view along line xv-xv in FIG. 13 with the inverter board at the non-connected position.
Figure 16:
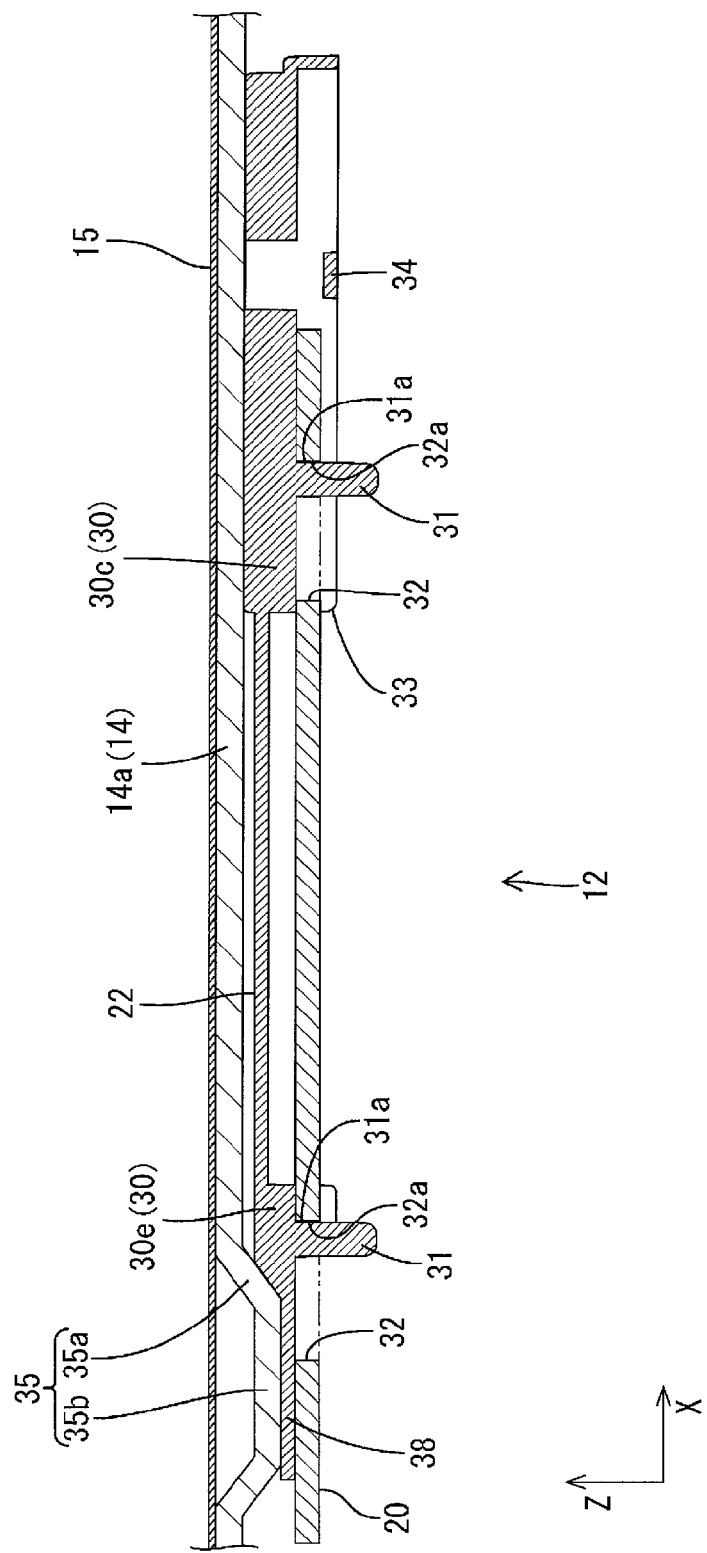
FIG. 16 is a cross-sectional view along line xvi-xvi in FIG. 13 with inverter board at the non-connected position.

When the inverter board 20 is moved from the removal position to the non-connected position, the side surfaces of the inverter board 20 are positioned relative to the second positioning parts 33 of the cover 22 as illustrated in FIG. 13. As a result, the inverter board 20 is properly set to the non-connected position with respect to the Y-axis direction. Specifically, the position of the inverter board 20 with respect to the Y-axis direction is adjusted as follows. The outer surfaces around the corners of the inverter board 20 are in contact with the inner walls of the second positioning portions 33 of the cover 22 on the chassis 14 side. As a result, the inverter board 20 is properly set to the non-connected position with respect to the Y-axis direction (see FIG. 5). As illustrated in FIGS. 14 to 16, when the inverter board 20 is set to the non-connected position, the spacer portions 38 and the board support portions 30 (the support projections 30a, the vertical support walls 30b, 30c, 30e, and the horizontal support walls 30d) are in contact with the front surface of the inverter board 20. As a result, the Z-axis positional relationship between the chassis 14 and the cover 22 is determined and the deformations such as a warp can be reduced.

The inverter board 20 is two-dimensionally positioned to proper X-axis position and Y-axis position when it is set to the non-connected position. During the movement of the inverter board 20, the chip components 20b and the leads of the lead components 20a project toward the chassis 14 or the cover 22 are less likely to touch parts of the chassis 14 or the cover 22 (e.g., the spacer portions 38). At the non-connected position, the through holes 41 of the inverter board 20 are not aligned with the respective mounting holes 39 and 40 (see FIG. 14). The through holes 41 are displaced from the mounting holes 39 and 40 toward the rear with respect to the Y-axis direction.

Next, each inverter board 20 is moved from the non-connected position to the connected position. When the inverter board 20 is moved from the non-connected position and pushed to the front along the X-axis direction, the connector connecting portions 20c are inserted in board holding holes 23c of the board holding portions 23b of the relay connectors 21. When the inverter board 20 is moved to the connected position, the board contacts 24b of the terminals 24 of the relay connectors 21 are elastically in contact with the terminals of the connector connecting portions 20c as illustrated in FIGS. 17 to 23. The inverter board 20 is electrically connected to the cold cathode tubes 18 via the relay connectors 21 and power supply to the cold cathode tubes 18 is established.

During the movement of the inverter board 20 from the non-connected position illustrated in FIG. 13 to the connected position illustrated in FIG. 17, the inverter board 20 slides over the ceilings 38b of the spacer portions 38. The spacer portions 38 are parts of the cover 22 made of resin. In comparison to the inverter board 20 sliding over the receiving portions 35 that are parts of the chassis 14 made of metal, the surface of the inverter board 20 is less likely to be damaged. Even when the receiving portions 35 have sharp protrusions such as burrs produced in manufacturing, the inverter board 20 is less likely to be scratched by the protrusions. The inverter board 20 has areas that rub against the spacer portions 38 during the connection. Specifically, the areas are parts of the (front) surfaces of the inverter board 20 facing the covers 22. Each area includes a part of the surface overlapping the spacer portion 38 in plan view when the inverter board 20 is at the connected position and a part thereof overlapping the spacer portion 38 in plan view when the inverter board 20 is at the non-connected position. If wiring patterns or small components are less likely to be damaged by the resin spacer portions 38 when they rub against the spacer portions 38, they can be arranged in those areas. If the inverter board 20 slides over the receiving portions 35 made of metal, the wiring patterns or the components cannot be arranged in the rubbing areas. In comparison to such a configuration, the inverter board 20 in the above configuration has larger arrangement areas in which the wiring patterns and the components can be arranged. Therefore, the arrangement density of the wiring patterns or the components on the inverter board 20 can be increased and the size of the inverter board 20 can be reduced.

During the connection (when the inverter board 20 is at a position between the non-connected position and the connected position), the through holes 41 of the inverter board 20 are not aligned with the mounting holes 39 of the receiving portions 35 and the mounting holes 40 of the spacer portions 38. Namely, the holes 41 are more to the rear than the mounting holes 39 and 40 with respect to the Y-axis direction. Therefore, the bolts 36 are not passed through the holes 39 to 41. This determines that the inverter board 20 is during the connection.

Figure 23:
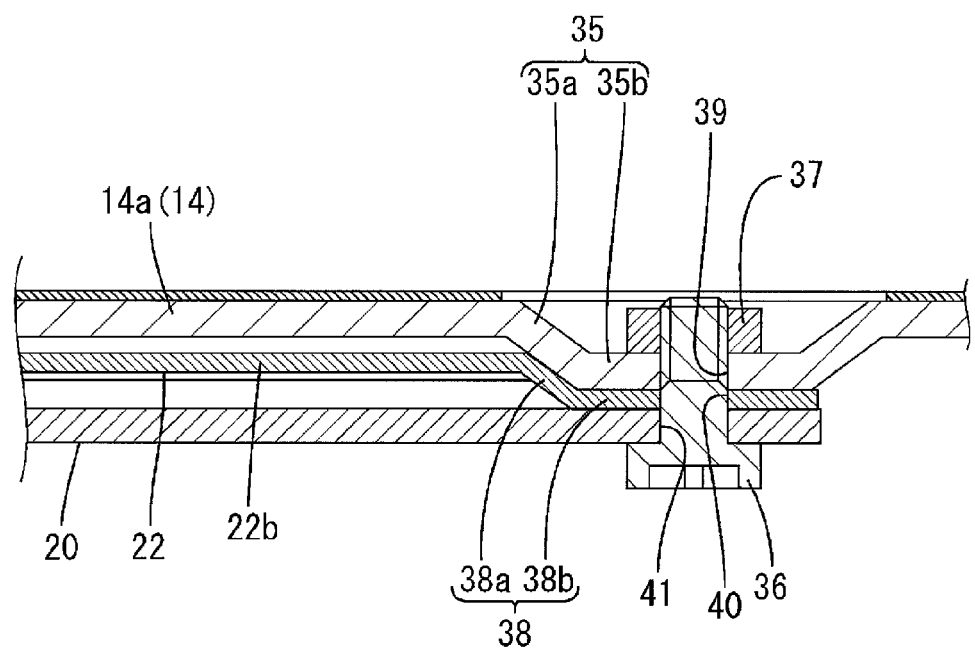
FIG. 23 is a cross-section view along line xxiii-xxiii in FIG. 17.

When the inverter board 20 is set to the connected position, each hole 41 of the inverter board 20 is aligned with the mounting hole 39 of the corresponding receiving portion 35 and the mounting hole 40 of the corresponding spacer portion 38 as illustrated in FIGS. 18 and 23. The through hole 41 and the mounting holes 39 and 40 continue from one another. Therefore, the bolt 36 can be passed through the holes 39 to 41. The nut 37 that is placed on the front side and housed in the receiving portion 35 is threaded onto the bolt 36 that is passed through the holes 39 to 41. As a result, the inverter board 20 is mounted and fixed to the cover 22 and the chassis 14. In this condition, the inverter board 20 is predetermined distances away from the cover 22 and the chassis 14 with respect to the Z-axis direction. The rear end portion of the inverter board 20 in the above condition is indirectly received by the receiving portions 35 of the chassis 14 via the spacer portions 38 of the covers 22.

Figure 20:
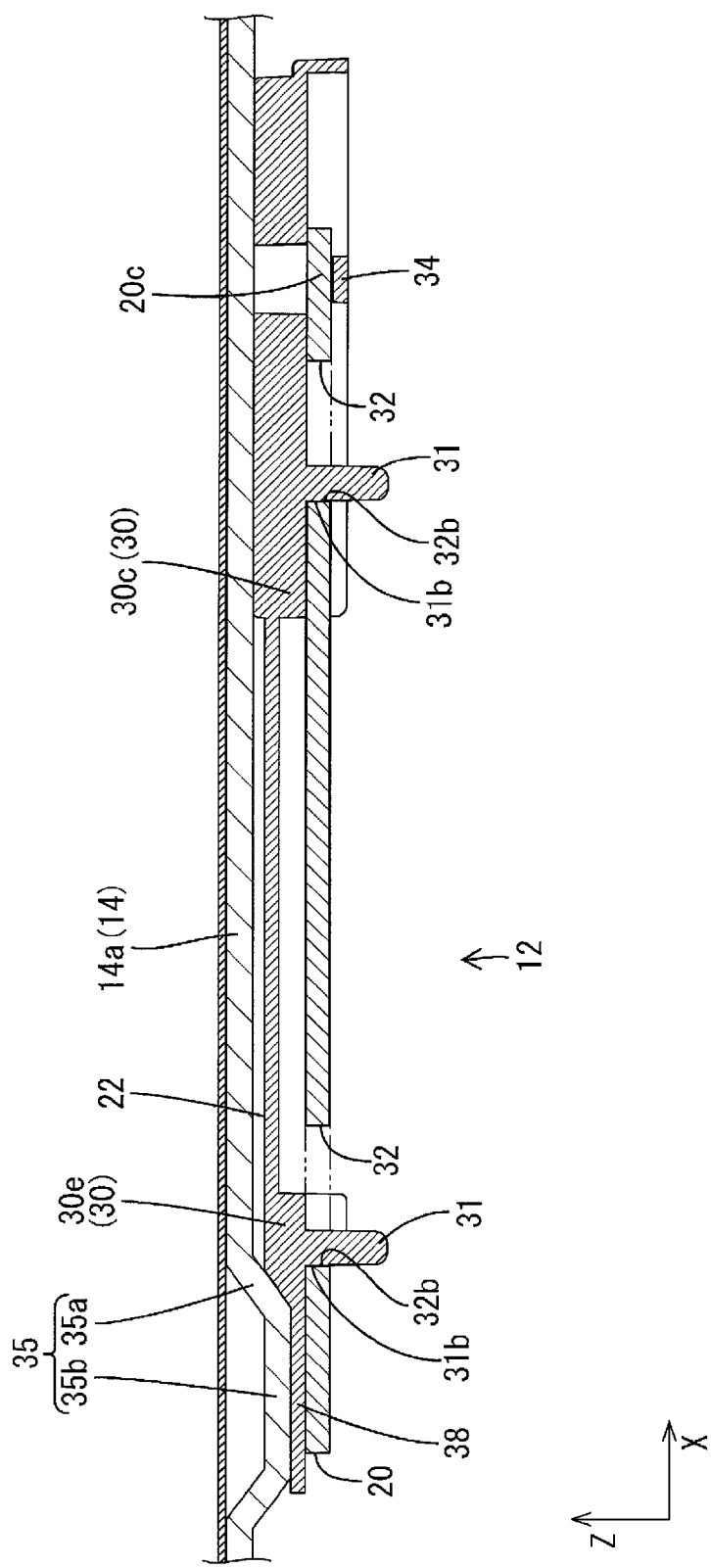
FIG. 20 is a cross-sectional view along line xx-xx in FIG. 17.

During the movement described above, the first positioning protrusions 31 inserted in the first positioning recesses move relatively in the X-axis direction within a range corresponding to the clearances. During the movement, the side surfaces of the inverter board 20 slide over the second positioning parts 33. The inverter board 20 moves linearly along the X-axis direction without being tilted during the movement guided by the second positioning parts 33. When the inverter board 20 is set to the connected position, the rear end portions 31b of the first positioning protrusions 31 are in contact with the rear edges 32b of the first positioning recesses 32 as illustrated in FIGS. 17 and 20. Therefore, the inverter board 20 is less likely to be pushed further to the front. During the movement of the inverter board 20 from the non-connected position to the connected position, the inverter board 20 is positioned with respect to the X-axis direction and the Y-axis direction. Therefore, the chip components 20b and the leads of the lead components 20a on the inverter board 20 are less likely to touch the parts of the chassis 14 and the cover 22.

Figure 19:
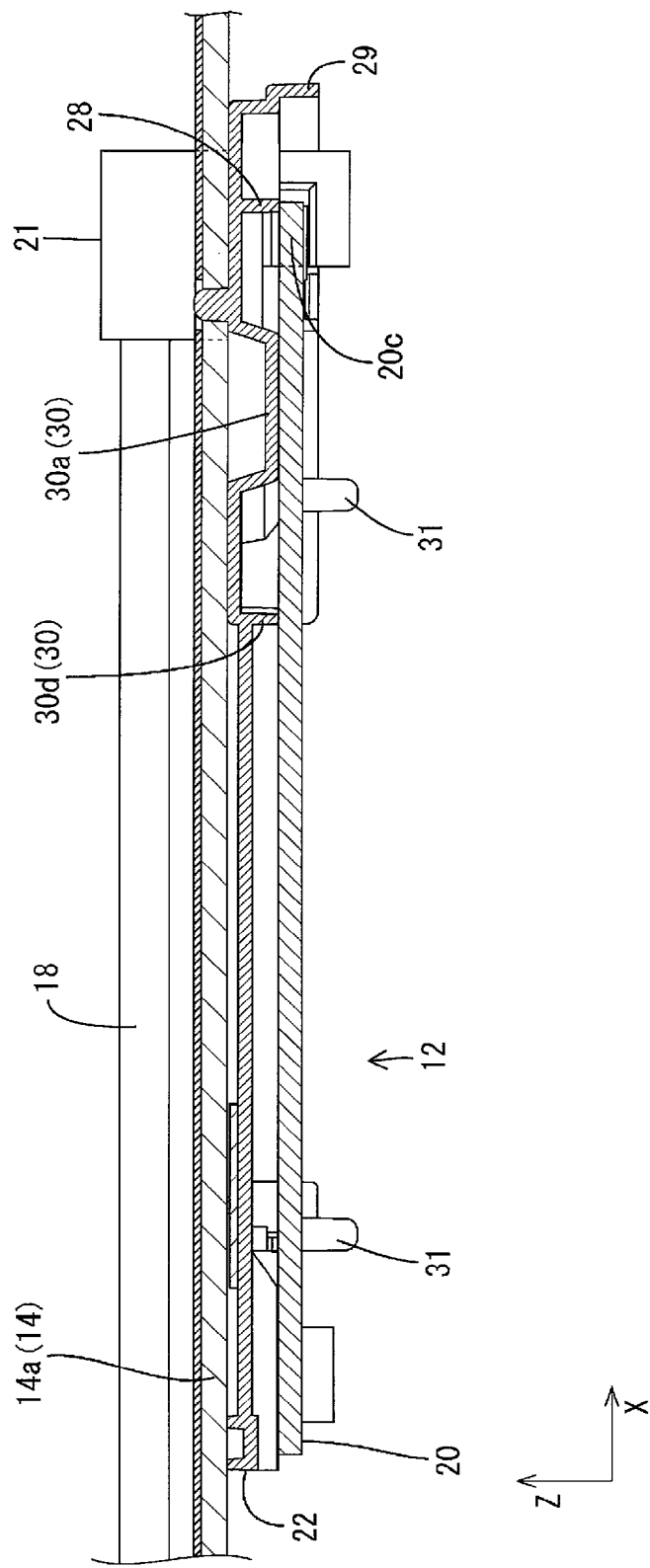
FIG. 19 is a cross-sectional view along line xix-xix in FIG. 17 with the inverter board at the connected position.
Figure 21:
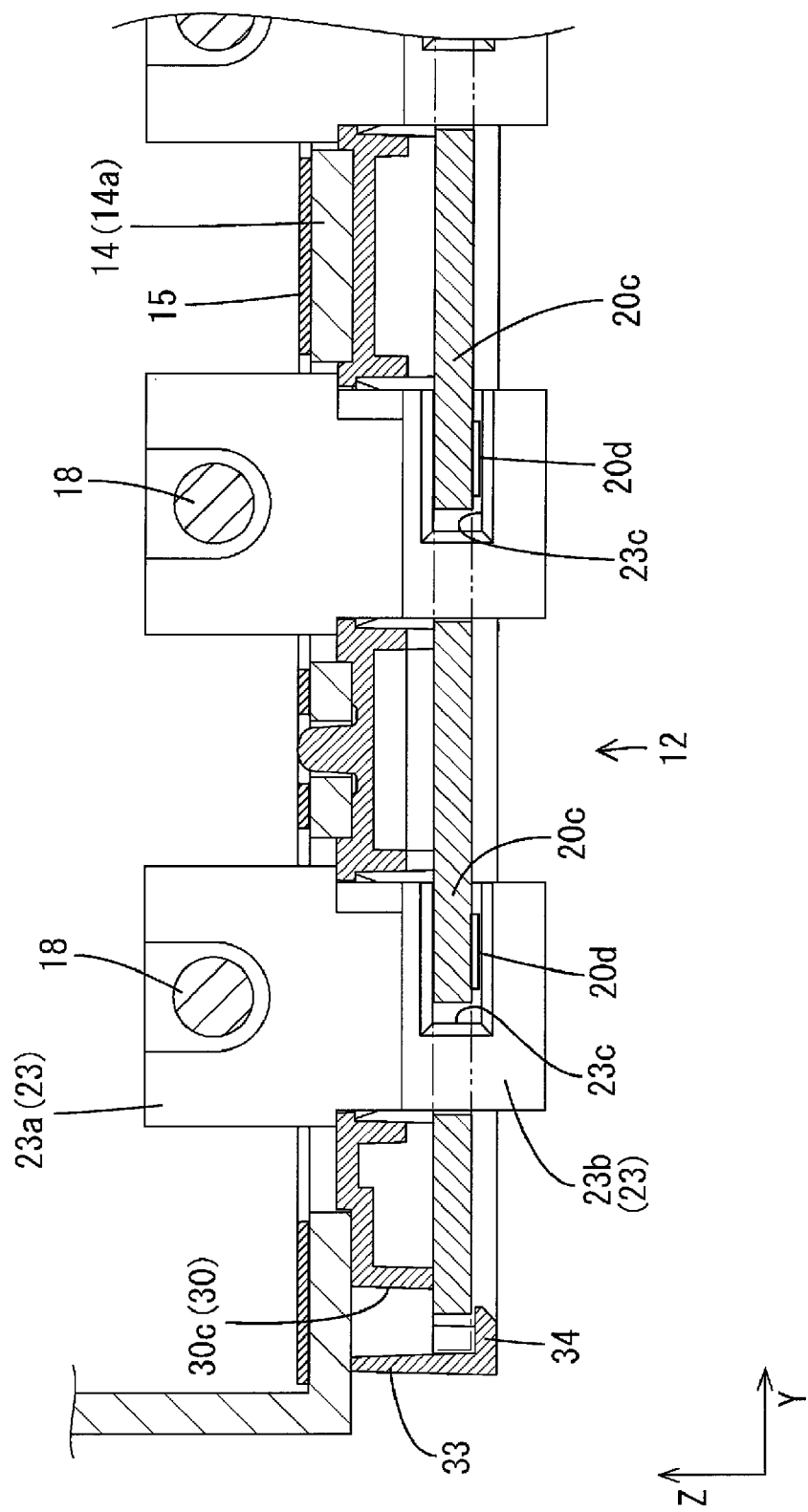
FIG. 21 is a cross-section view along line xxi-xxi in FIG. 17.
Figure 22:
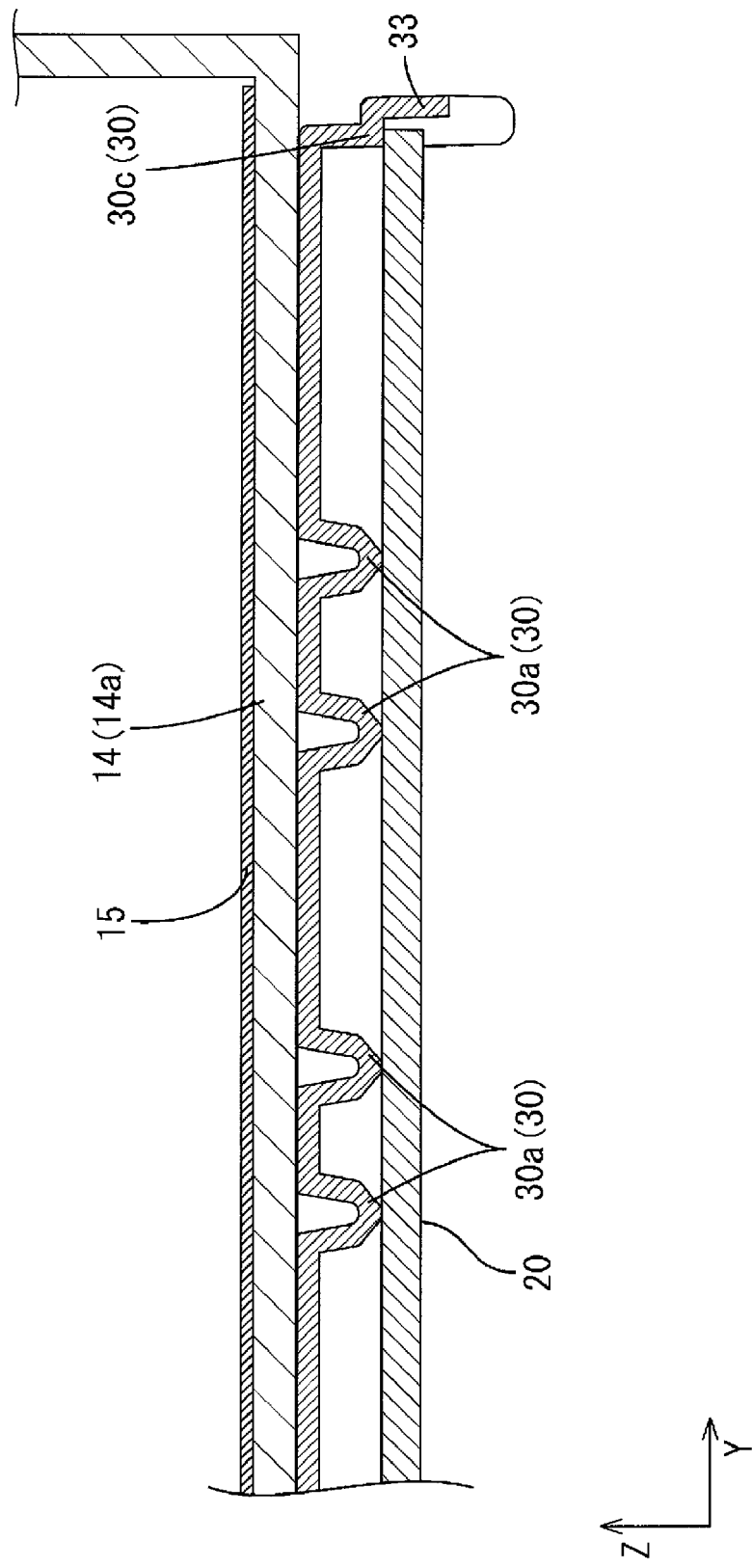
FIG. 22 is a cross-section view along line xxii-xxii in FIG. 17.

When the inverter board 20 is set to the connected position, the front end portions of the side end portions of the inverter board 20 are held by the board stoppers 34 from the rear side, as illustrated in FIGS. 20 and 21. Moreover, the board support portions 30 (the support projections 30a, the front vertical support walls 30b and 30c, and the horizontal support walls 30d) are in contact with the front surface of the inverter board 20, as illustrated in FIGS. 19 to 22. With this configuration, a deformation, such as a warp, of the inverter board 20 along the Z-axis direction, that is, the direction perpendicular to the board surface is effectively reduced. Moreover, a backlash is effectively reduced. As illustrated in FIGS. 17 and 19, at the connected position, parts of the connector connecting portions 20c of the inverter board 20 are outside the relay connectors 21. The blocking portions 28 of the cover 22 are in contact with those parts from the front side. As a result, the spaces between the adjacent relay connectors 21 are closed. Namely, the space between the inverter board 20 and the cover 22 is closed by the blocking portions 28 and the relay connectors 21 without opening to the front. Foreign substances (including insects or other living substances) entering the space between the inverter board 20 and the cover 22 from the front side is properly blocked. Therefore, an adverse effect on the connection between the relay connectors 21 and the inverter board 20 is not caused by the foreign substances.

When the inverter board 20 is moved from the removal position to the non-connected position, the inverter board 20 may be set at a position slightly more to the front than the non-connected position. In such a case, the inverter board 20 is still between the non-connected position and the connected position. Therefore, the components of the inverter board 20 are less likely to touch the parts of the chassis 14 or the cover 22.

As described above, the backlight unit 12 in this embodiment includes the cold cathode tubes 18, the chassis 14, the inverter boards 20, the relay connectors 21, and the covers 22. The chassis 14 houses the cold cathode tubes 18. The inverter boards 20 are arranged on the opposite side of the chassis 14 from the cold cathode tubes 18 and configured to supply drive power to the cold cathode tubes 18. The relay connectors 21 are mounted to the chassis 14 such that the inverter boards 20 are connected to or disconnected from the relay connectors 21 by moving them in the direction along the board surface of the inverter boards 20. The relay connectors 21 are configured to relay power supply from the inverter boards 20 to the cold cathode tubes 18. Each cover 22 is arranged between the chassis 14 and the inverter board 20. It is made of a material having relatively lower strength than the chassis 14. The chassis 14 has the receiving portions 35 that receive the inverter board2 20. The receiving portions protrude toward the inverter boards 20. The covers 22 have the spacers 38 that are arranged between the receiving portions 35 and the inverter boards 20.

In the above configuration, the inverter board 20 is received by the receiving portions 35 of the chassis 14 via the spacer portions 38 of the covers 22. The covers 22 are made of material having lower strength than the chassis 14. During connecting the inverter board 20 to the relay connectors 21, the inverter board 20 is less likely to touch the receiving portions 35 of the chassis 14 made of material having higher strength than the covers 22. Therefore, the components mounted on the inverter board 20 are less likely to be damaged. With this configuration, large areas of the inverter board 20 can be used as arrangement areas in which the components can be arranged. Therefore, the arrangement density of the components on the inverter board 20 can be increased and the size of the inverter board 20 can be reduced.

More preferably, the lighting device of this embodiment may include the following configurations.

(1) The chassis 14 is made of metal while the covers 22 are made of resin. Namely, the materials used for preparing the chassis 14 and the covers 22 with different strengths are inexpensive widely used materials that are easy to obtain. Furthermore, even when the receiving portions 35 of the chassis 14 made of metal have burrs, the receiving portions 35 are less likely to touch the inverter board 20 because of the spacer portions 38 of the covers 22 made of resin. This configuration is further suitable for protecting the inverter board 20 from damage.

(2) Each cover 22 is made of insulating material. Therefore, the inverter board 20 is insulated from the chassis 14.

(3) Each cover 22 is made of synthetic resin. Namely, the covers 22 are made of widely used material that is easy to obtain.

(4) Each cover 22 is made of material with lower hardness than the chassis 14. During connecting or disconnecting the inverter board 20 to or from the relay connectors 21, the inverter board 20 may slide over the spacer portions 38. Even in such a case, the inverter board 20 is less likely to be scratched.

(5) The inverter board 20 is the predetermined distance away from the cover 22. The spacer portions 38 protrude toward the inverter board 20. This configuration is suitable for a lighting device in which a space is required between the inverter board 20 and the cover 22. With the space between the cover 22 and the inverter board 20, arrangement areas in which components are arranged can be increased.

(6) The spacer portions 38 are fitted in the respective receiving portions 35. By fitting the spacer portions 38 in the receiving portions 35 during the mounting of the covers 22 to the chassis 14, the covers 22 are positioned relative to the chassis 14.

(7) The bolts 36 are provides as mounting members for mounting and holding the inverter boards 20 received by the receiving portions 35 via the spacer portions 38. With the bolts 36, the inverter boards 20 are mounted and held.

(8) The spacer portions 38 and the receiving portions 35 have the mounting holes 39 and 40, respectively. The mounting holes 39 and 40 are through holes through which the bolts 36 are passed. With the bolts 36 passed through the mounting holes 39 of the spacer portions 38 and the mounting holes 40 of the receiving portions 35, the inverter boards 20 can be mounted and held.

(9) Each inverter board 20 can be moved between the non-connected position and the connected position. The inverter board 20 is disconnected from the relay connectors 21 at the non-connected position and connected to the relay connectors 21 at the connected position. Before the inverter board 20 is set to the connected position, each mounting hole 39 is not aligned with the corresponding mounting hole 40. When the inverter board 20 is set at the connected position, the mounting hole 39 is aligned with the mounting hole 40. When the inverter board 20 is moved from the non-connected position to the connected position, the bolts 36 can be passed through the through holes 41 and the mounting holes 39 and 40. When the bolts 36 are passed, a condition that the inverter board 20 is at the connected position is confirmed.

(10) The receiving portions 35 and the spacer portions 38 are arranged in the rear end portion of each inverter board 20, corresponding to the end portion opposite from the relay connectors 21. Another configuration may be considered. The configuration includes the relay connectors 21 arranged around the middle of the inverter board 20 with respect to the connecting direction. In comparison to such a configuration, the layouts of the components on the inverter boards 20 of this embodiment can be more flexibly designed. The front end portion of each inverter board 20, that is, the end portion on the relay connector 21 side is connected to the relay connectors 21. The other end portion of the inverter board 20 is received by the receiving portions 35 via the spacer portions 38. Therefore, the inverter board 20 is held with a good balance.

(11) The receiving portions 35 and the spacer portions 38 are arranged corresponding to the end portion of each inverter board 20 with respect to the direction perpendicular to the connecting direction to the relay connectors 21 along the board surface of the inverter board 20. Another configuration may be considered. In the configuration, the receiving portions 35 and the spacer portions 38 are arranged around the middle portion of the inverter board 20 with respect to the direction perpendicular to the connecting direction along the board surface of the inverter board 20. In comparison to such a configuration, the layouts of the components on the inverter boards 20 can be more flexibly designed.

(12) The receiving portions 35 and the spacer portions 38 are arranged corresponding to the end portions of each inverter board 20 with respect to the direction perpendicular to the connecting direction to the relay connectors 21 (the Y-axis direction) along the board surface of the inverter board 20. Another configuration may be considered. In the configuration, the receiving portions 35 and the spacer portions 38 are arranged around the middle portion of the inverter board 20 with respect to the direction perpendicular to the connecting direction along the board surface of the inverter board 20. In comparison to such a configuration, the layouts of the components on the inverter boards 20 can be more flexibly designed. Furthermore, the inverter board 20 is held with a good balance.

(13) The receiving portions 35 and the spacer portions 38 are arranged corresponding to the middle portion of each inverter board 20 with respect to the direction perpendicular to the connecting direction to the relay connectors 21 along the board surface of the inverter board 20. The middle portion of the inverter board 20 with respect to the direction perpendicular to the connecting direction to the relay connectors 21 along the board surface of the inverter board 20 can be supported by the receiving portions 35 and the spacer portions 38. Because the middle portion of the inverter board 20 with respect to the direction perpendicular to the connecting direction to the relay connectors 21 along the board surface of the inverter board 20 can be supported by the receiving portions 35 and the spacer portions 38, a deformation of the inverter board 20, such as a warp, is less likely to occur.

(14) The inverter board 20 can be moved between the non-connected position and the connected position. The inverter board 20 is disconnected from the relay connectors 21 at the non-connected position and connected to the relay connectors 21 at the connected position. The positioning structures are provided for positioning the inverter board 20 relative to the chassis 14 with respect to at least one direction along the board surface of the inverter board 20 when the inverter board is at the non-connected position. Therefore, the inverter board 20 at the non-connected position is positioned relative to the chassis 14 with respect to at least one direction along the board surface of the inverter board 20. During setting of the inverter board 20 to the non-connected position or moving of the inverter board 20 from the non-connected position to the connected position, the components mounted on the inverter board 20 are less likely to touch the parts of the chassis 14.

(15) The positioning structures include the first positioning structure for positioning the inverter board 20 with respect to the first direction along the connecting direction of the inverter board 20 into the relay connectors 21. With this configuration, the inverter board 20 can be positioned with respect to the first direction along the connecting direction of the inverter board 20.

(16) The first positioning structure includes the first positioning protrusions 31 and the first positioning recesses 32. The first positioning protrusions 31 are arranged on the chassis 14 side. The first positioning recesses 32 are formed in the inverter board 20 so as to receive the first positioning protrusion 31. Each first positioning recess 32 is formed such that the clearance is provided between the first positioning protrusion 31 and the edges of the first positioning recess 32. When the inverter board 20 is at the non-connected position, the front end 31a of the first positioning protrusion 31 is in contact with the front edge 32a of the first positioning recess 32 with respect to the connecting direction. The rear end portion 31b of the first positioning protrusion 31 is separated from the rear edge 32b of the first positioning recess 32 with respect to the connecting direction. During the setting of the inverter board 20 to the non-connected position, the inverter board 20 is less likely to be displaced relative to the chassis 14 to the rear with respect to the connecting direction. The movement of the inverter board 20 is allowed within the range corresponding to the clearances between the first positioning protrusion 31 and the edges of the first positioning recess 32.

(17) When the inverter board 20 is at the connected position, the rear end portions 31b of the first positioning protrusions 31 are in contact with the rear edges 32b of the first positioning recesses 32 with respect to the connecting direction. When the inverter board 20 is moved from the non-connected position to the connected position, the inverter bard 20 is less likely to be displaced to the front with respect to the connecting direction relative to the chassis 14.

(18) The first positioning protrusions 31 are arranged on the chassis 14 side and the first positioning recesses 32 are formed in the inverter board 20. A configuration in which the first positioning protrusions are arranged on the inverter board 20 side requires special design. In comparison to such a configuration, the inverter board 20 can be prepared with the positioning structure at low cost.

(19) Each first positioning recess 32 is formed by cutting out a part of the inverter board 20. The position of the first positioning protrusion 31 in the first positioning recess 32 can be confirmed by viewing the inverter board 20 from the side opposite from the chassis 14. Therefore, the inverter board 20 can be precisely positioned.

(20) The positioning structures include the second positioning structures for positioning the inverter board 20 with respect to the second direction perpendicular to the first direction that is along the connecting direction of the inverter board 20 to the relay connectors 21. With the second positioning structures, the inverter board 20 at the non-connected position is positioned with respect to the second direction perpendicular to the first direction that is along the connecting direction of the inverter board 20.

(21) The second positioning structure is provided on each cover 22. It includes the second positioning portion 33 that is in contact with the inverter board 20 while the inverter board 20 is moved from the non-connected position to the connected position. When the inverter board 20 is moved from the non-connected position to the connected position, the movement thereof is guided by the second positioning portion 33. Therefore, the inverter board 20 can be stably moved.

(22) The positioning structures are provided at two locations away from each other in the front-rear direction along the connecting direction of the inverter board 20 to the relay connectors 21. With this configuration, the inverter board 20 can be further precisely positioned. Furthermore, the positioning structures may be arranged such that a person working on them can visually confirm the positions thereof. With such a configuration, they are easily viewed.

(23) The positioning structure is arranged at the end with respect to the second direction perpendicular to the first direction that is along the connecting direction of the inverter board 20 into the relay connectors 21. In comparison to a configuration in which the positioning structure is arranged around the center with respect to the second direction, design of the wiring patterns or arrangement of the components on the inverter board is less likely to be limited.

(24) The positioning structures are arranged at the ends with respect to the second direction perpendicular to the first direction that is along the connecting direction of the inverter board 20 into the relay connectors 21. In comparison to a configuration in which the positioning structure is arranged around the center with respect to the second direction, design of the wiring patterns or arrangement of the components on the inverter board is less likely to be limited. Furthermore, the inverter board 20 is more precisely positioned by the positioning structures provided at both ends with respect to the second direction.

(25) Each cover 22 includes the board stopper 34 that is in contact with the corresponding inverter board 20 from the side opposite from the chassis 14. With the board stoppers 34, the inverter boards 20 are less likely to be deformed toward the side opposite from the chassis 14.

(26) The board stoppers 34 are arranged such that the front end portion 20e of the inverter board 20 with respect to the connecting direction is held against the board stoppers 34 when the inverter board 20 is at the connected position. With this configuration, reliability in connection between the inverter board 20 and the relay connectors 21 improves.

(27) The covers 22 include the board support portions 30 that protrude toward the inverter boards 20 so as to be in contact with the inverter boards 20. The board support portions 30 support the inverter boards 20. With this configuration, the preferable positional relationship between the chassis 14 and each inverter board 20 is maintained with respect to the direction perpendicular to the board surface of the inverter board 20.

(28) Each board support portion 30 includes the support projections 30a, the center vertical support wall 30b, and the horizontal support wall 30d. The support projections 30a support the middle portion of the inverter board 20 with respect to the second direction perpendicular to the first direction that is along the connecting direction of the inverter board 20 to the relay connectors 21. The middle portion of the inverter board 20 is supported by the support projections 30a, the center vertical support wall 30b, and the horizontal support wall 30d. Therefore, a deformation of the inverter board 20, such as a warp, is less likely to occur. If the backlight unit 12 is provided in a large size, the inverter boards 20 are also provided in a large size. Namely, the inverter boards 20 are more likely to be warped, or deformed. Therefore, this configuration is especially useful.

(29) A plurality of the support projections 30a of the center support portions are arranged along the second direction so as to be parallel to each other. With this configuration, deformations, such as warps, of the inverter boards 20 are further less likely to occur. Furthermore, this configuration is further suitable for the inverter boards 20 in larger size.

(30) The support projections 30a of the center support portions are arranged in areas adjacent to the relay connectors 21. Therefore, parts of the inverter boards 20 in the areas adjacent to the relay connectors 21 are less likely to be warped, or deformed. Therefore, the reliability in connection between the inverter board 20 and the relay connectors 21 improves.

(31) The board support portion 30 includes the end vertical support wall 30c and the rear vertical support wall 30e. The end vertical support wall 30c and the rear vertical support wall 30e support the end of the inverter board 20 with respect to the second direction perpendicular to the first direction that is along the connecting direction of the inverter board 20 to the relay connectors 21. The end of the inverter board 20 is supported by the end vertical support wall 30c and the rear vertical support wall 30e.

(32) A pair of the end vertical support walls 30c and a pair of the rear vertical support walls 30e of the end support portions are provided for each inverter board 20 so as to support the ends of the inverter board 20. The ends of each inverter board 20 are supported by the pairs of the end vertical support walls.

(33) The chassis 14 has the connector insertion holes 14b that are through holes in which the relay connectors 21 are inserted. Each cover 22 has the connector holes 25 in which the relay connectors 21 are fitted. The connector holes 25 are through holes that continue into the connector insertion holes 14b. With this configuration, the relay connectors 21 can be mounted to the chassis 14 with the relay connectors 21 inserted in the connector insertion holes 14b of the chassis 14 and the connector hole 25 of the covers 22.

(34) Each connector insertion hole 14b is larger than the connector holes 25. With this configuration, each relay connector 21 is properly separated from the edges of the corresponding connector insertion hole 14b of the chassis 14. Even when high-voltage currents flow through the relay connectors 21, the currents do not leak to the chassis 14 side.

(35) Each cover 22 includes the holding protrusions 26 that are fitted in the connector insertion holes 14b. Each holding protrusion 26 is provided between the edge of the connector insertion hole 14b of the chassis 14 and the relay connector 21. Therefore, the relay connector 21 is properly isolated from the chassis 14. Furthermore, the cover 22 can be positioned relative to the chassis 14.

(36) The support projections 30a of the board support portions 30 are arranged adjacent to the relay connectors 21. Because parts of the inverter board 20 around the relay connectors 21 are less likely to be deformed, for example, warped, the reliability in connection between the inverter board 20 and the relay connectors 21 improves.

(37) The blocking portions 28 are arranged so as to in contact with the front end portions of the respective inverter boards 20 connected to the relay connectors 21. With this configuration, the inverter boards 20 are kept from touching foreign substances.

(38) The ribs 27 are provided at the edges of the connector holes 25. The ribs 27 project toward the inverter board 20. The blocking portions 28 are connected to the ribs 27. With the ribs 27 connected to the blocking portions 28, no space is provided on the front with respect to the connecting direction. Therefore, foreign substances are properly blocked. Moreover, high strength can be achieved.

<Other Embodiment>

The present invention is not limited to the above embodiments explained in the above description. The following embodiments may be included in the technical scope of the present invention, for example.

(1) Other than the above embodiments, a different kind of synthetic resin can be used for the covers or a different kind of metal can be used for the chassis as necessary.

(2) In the above embodiments, the covers are made of synthetic resin. However, they may be made of natural resin.

(3) In the above embodiments, the covers are made of resin. However, they can be made of another kind of material such as metal. A different kind of material can be used as necessary as long as the material has strength (or hardness) lower than the chassis.

(4) In the above embodiments, the chassis is made of metal. However, the chassis can be made of another kind of material such as resin. A different kind of material can be used as necessary as long as the material has higher strength (or hardness) than the covers.

(5) In the above embodiments, the hardness that is one of indexes of the strength is considered for selecting the material used for the covers having the spacer portions. Namely, the material having the lower hardness than the material of the chassis having the receiving portions is used. However, another kind of material can be selected based on an index of the strength other than the hardness. The indexes of the strength include an elastic modulus, a yield strength, and a tension strength. A material having at least one of the indexes lower than that of the chassis can be selected for the covers.

(6) In the above embodiments, the spacer portions are fitted in the receiver portions. However, the spacer portions may not be fitted in the receiving portions, specifically, the walls of the spacer portions are not in contact with the walls of the receiving portions.

(7) In the above embodiments, the space is provided between each cover and the corresponding inverter board, and the spacer portions protrude toward the inverter board. However, a configuration in which little space is provided between each cover and the corresponding inverter board and spacer portions do not protrude toward the inverter board may be included in the technical scope of the present invention.

(8) In the above embodiments, the receiving portions are integrally formed with the chassis by drawing parts of the chassis. However, the receiving portions may be integrally formed with the chassis by cutting and bending parts of the chassis. Furthermore, the receiving portions may be formed separately from the chassis and attached thereto so as to form a single piece with the chassis.

(9) In the above embodiments, the spacer portions are integrally formed with the covers. However, the spacer portions may be formed separately from the covers and attached thereto so as to form a single piece with each cover.

(10) The layouts of the receiving portions relative to the inverter boards and the chassis can be altered from the above embodiments as necessary. For example, the receiving portions and the spacer portions may be arranged around the center or the front of the inverter board with respect to the X-axis direction.

(11) The numbers of the receiving portions and the spacer portions can be altered from the above embodiments as necessary. For example, the numbers may be two or smaller, or four or larger.

(12) In the above embodiments, the bolts are used as the fixing members, onto which the nuts are tightened. However, screws may be used as the fixing members and the inner walls of the mounting holes of the receiving portions may be threaded such that the screws can be engaged therein. Fixing members other than the bolts or the screws may be used. For example, clips having stoppers may be used. When each clip is inserted in the mounting hole, the stoppers are held against the edge of the mounting hole. With this configuration, the inverter boards can be mounted and held to the chassis and the covers.

(13) In the above embodiments, the inverter boards are mounted and held with the mounting members. However, the inverter boards may be mounted and held with adhesives, or by plastic welding or metal welding.

(14) In the above embodiments, the first positioning structures and the second positioning structures are provided as the positioning structures for positioning the inverter board. However, only the first positioning structures may be provided for positioning the inverter board only with respect to the X-axis direction. Furthermore, only the second positioning structures may be provided for positioning the inverter board only with respect to the Y-axis direction.

(15) In the above embodiments, the first positioning protrusions are provided on the covers on the chassis side and the first positioning recesses are provided in the inverter boards as the first positioning structures. However, the first positioning recesses may be provided in the covers on the chassis side, and the first positioning protrusions may be provided on the inverter boards.

(16) In the above embodiments, the first positioning recesses are formed by cutting out parts of the inverter boards. However, the first positioning recesses may be formed by denting parts of the surfaces of the inverter boards. To form the first positioning recesses in the covers on the chassis side, they are formed in the same manner as above. Namely, the first positioning recesses may be formed by denting parts of the rear surfaces of the covers.

(17) In the above embodiments, the rear end portions of the first positioning protrusions are in contact with the rear end edges of the first positioning recesses when the inverter board is at the connected position. However, the rear end portions may not be in contact with the rear edges. In that case, the movement of the inverter board to the front is restricted by the front end surfaces of the connector connecting portions held against the extending portions of the front walls.

(18) In the above embodiments, the second positioning portions are in contact with the side end surfaces of the inverter boards. However, each inverter board may have recesses (including cutouts) through which the second positioning portions can be passed. The second positioning portions may be in contact with the side walls of the recesses.

(19) In the above embodiments, the first positioning protrusions are connected to the second positioning portions. However, they may be separately and independently provided.

(20) In the above embodiment, the board stoppers are connected to the second positioning portions or the first positioning protrusions. However, they may be separately and independently provided.

(21) In the above embodiments, the board stoppers are in contact with the front end portions of the inverter board. However, the board stoppers may be arranged at different locations such that the board stoppers are in contact with portions of the inverter board other than the front end portions.

(22) In the above embodiments, the board stoppers are in contact with the front end portions of the inverter boards. However, the board stoppers may be in contact with portions of the inverter boards other than the front end portions.

(23) In the above embodiments, the first positioning structures are arranged away from each other in the front-rear direction. Moreover, the second positioning structures are arranged also away from each other in the front-rear direction. However, the first positioning structure may be arranged at only one location with respect to the X-axis direction (the first direction), and the second positioning structure may be arranged at only location with respect to the X-axis direction.

(24) In the above embodiments, the first positioning structures are arranged at the respective ends of the inverter board with respect to the Y-axis direction (the second direction). The second positioning structures are also arranged at the respective ends. However, the first positioning structure and the second positioning structure are arranged only at one of the ends of the inverter board with respect to the Y-axis direction. Furthermore, the first positioning structure and the second positioning structure may be arranged around the center of the inverter board with respect to the Y-axis direction.

(25) Different kinds of components from those in the above embodiments may be mounted on the inverter boards.

(26) In the above embodiments, each connector insertion hole of the chassis is larger than the connector hole of the cover. However, the connector insertion hole and the connector holes may be formed in the same size or having an opposite size-relationship. In that case, the holding protrusions of the cover may not be provided.

(27) In the above embodiments, the first positioning protrusions are connected to the second positioning parts. However, they may be separated and independently provided. In that case, the blocking portions may be arranged parts of the areas between the adjacent connector holes.

(28) In the above embodiments, the covers include the support projections, the vertical support walls, and the horizontal support walls. However, one or more, even all, of them may not be included. The number, shapes, and arrangements of the board support portions may be altered as necessary.

(29) In the above embodiments, two covers are attached to the chassis along a corresponding long-side end of the chassis. However, one, three or more covers may be used. When only one cover is used, a pair of the second blocking portions and a pair of the second positioning portions may be provided. They may be arranged at the respective ends of the cover with respect to the Y-axis direction.

(30) In the above embodiments, each inverter board is directly connected to the relay connectors. However, a relay board electrically connected to the inverter board via an FPC may be connected to the relay connectors such that the inverter board is indirectly connected to the relay connecters.

(31) In the above embodiments, each inverter board is provided for the electrodes at the respective ends of the cold cathode tubes. However, one of the inverter boards may not be provided and the cold cathode tubes may be driven by a single inverter board on one side. In that case, the relay connectors on a side on which the inverter board is not provided (i.e., on a lower potential side) may be connected to a grounding circuit.

(32) In the above embodiments, each cold cathode tube includes the outer lead extending from the ends of the glass tube, and the outer leads are connected to the connectors. However, ferrules connected to the outer leads may be fitted onto the glass tube, and the ferrules may be connected to the connectors.

(33) In the above embodiments, the cold cathode tubes that are one kind of fluorescent tubes are used as light sources. However, other types of fluorescent tubes including hot cathode tubes can be used. Furthermore, discharge tubes (e.g., mercury lamps) other than the fluorescent tubes can be used.

(34) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to white-and-black liquid crystal display devices other than the color liquid crystal display device.

(35) In the above embodiments, the liquid crystal display device including the liquid crystal panel as a display component is used. However, the present invention can be applied to display devices including other types of display components.

(36) In the above embodiments, the television receiver including the tuner is used. However, the technology can be applied to a display device without the tuner.

The invention claimed is:

1. A lighting device comprising:
a light source;
a chassis housing the light source;
a power supply board arranged on a chassis side opposite from the light source and configured to supply drive power to the light source;
at least one relay connector mounted to the chassis such that the power supply board is connected thereto so as to be removable in one direction along a board surface of the power supply board, and configured to relay power supply from the power supply board to the light source; and
a cover made of material having a strength higher than the chassis and arranged between the chassis and the power supply board, wherein:
the chassis has at least one receiving portion receiving the power supply board, the receiving portion protruding toward the power supply board; and
the cover has at least one spacer portion arranged between the receiving portion and the power supply board.

2. The lighting device according to claim 1, wherein:
the chassis is made of metal; and
the cover is made of resin.

3. The lighting device according to claim 2, wherein the cover is made of insulating material.

4. The lighting device according to claim 2, the cover is made of synthetic resin.

5. The lighting device according to claim 1, wherein the cover is made of material having a lower hardness than the chassis.

6. The lighting device according to claim 1, wherein:
the power supply board and the cover are arranged with a predetermined space therebetween; and
the spacer portion protrudes toward the power supply board.

7. The lighting device according to claim 6, wherein the spacer portion is fitted in the receiving portion.

8. The lighting device according to claim 1, further comprising a mounting member with which the power supply board received by the receiving portion is mounted and held to the receiving portion via the spacer portion.

9. The lighting device according to claim 8, wherein the spacer portion and the receiving portion have mounting holes, respectively, the mounting holes being through holes through which the mounting member is passed.

10. The lighting device according to claim 9, wherein:
the power supply board is movable between a non-connected position at which the power supply board is disconnected from the relay connector and a connected position at which the power supply board is connected to the relay connector; and
the power supply board has a through hole that is not aligned with the mounting holes when the power supply board is not at the connected position and aligned with the mounting holes when the power supply board is at the connected position.

11. The lighting device according to claim 1, wherein the receiving portion and the spacer portion are arranged in areas corresponding to an end portion of the power supply board away from the relay connector.

12. The lighting device according to claim 1, wherein the receiving portion and the spacer portion are arranged in areas corresponding to an end portion of the power supply board with respect to a direction along the board surface of the power supply board and perpendicular to the connecting direction of the power supply board to the relay connector.

13. The lighting device according to claim 1, wherein:
the at least one receiving portion includes a plurality of receiving portions and the at least one spacer portion includes a plurality of spacer portions; and
the receiving portions and the spacer portions are arranged in areas corresponding to end portions of the power supply board with respect to a direction along the board surface of the power supply board and perpendicular to the connecting direction of the power supply board to the relay connector.

14. The lighting device according to claim 13, wherein the receiving portion and the spacer portion are arranged in areas corresponding to a middle portion of the power supply board with respect to the direction along the board surface and perpendicular to the connecting direction of the power supply board to the relay connector.

15. The lighting device according to claim 1, further comprising a positioning structure, wherein:
the power supply board is removable between the non-connected position at which the power supply board is disconnected from the relay connector and the connected position at which the power supply board is connected; and
the positioning structure positions the power supply board at the non-connected position relative to the chassis with respect to at least one of directions along the board surface of the power supply board.

16. The lighting device according to claim 15, wherein the positioning structure includes a first positioning structure positioning the power supply board with respect to a first direction along the connecting direction of the power supply board to the relay connector.

17. The lighting device according to claim 16, wherein the first positioning structure includes a first positioning protrusion and a first positioning recess, the first positioning protrusion being provided on either one of the power supply board and the cover, the first positioning recess being provided in the other one of the power supply board and the cover so as to receive the first positioning protrusion with a clearance with respect to the connecting direction such that a front end portion of the first positioning protrusion with respect to the connecting direction is in contact with a front edge of the first positioning recess with respect to the connecting direction and a rear end portion of the first positioning protrusion with respect to the connecting direction is separated from a rear edge of the first positioning recess with respect to the connecting direction with the power supply board at the non-connected position.

18. The lighting device according to claim 17, wherein the rear end portion of the first positioning protrusion with respect to the connecting direction is in contact with the rear edge of the first positioning recess with respect to the connecting direction with the power supply board at the connected position.

19. The lighting device according to claim 17, wherein:
the first positioning protrusion is provided on the cover; and
the first positioning recess is provided in the power supply board.

20. The lighting device according to claim 19, wherein the first positioning recess is formed by cutting a part of the power supply board.

21. The lighting device according to claim 15, wherein the positioning structure includes two portions that are away from each other in a front-rear direction along the connecting direction of the power supply board to the relay connector.

22. The lighting device according to claim 15, wherein the positioning structure is arranged at the end with respect to the second direction perpendicular to the first direction that is along the connecting direction of the power supply board to the relay connector.

23. The lighting device according to claim 15, wherein the positioning structure includes two portions arranged at the ends with respect to the second direction perpendicular to the first direction that is along the connecting direction of the power supply board to the relay connector.

24. The lighting device according to claim 1, wherein the positioning structure includes a second positioning structure that positions the power supply board with respect to the second direction perpendicular to the first direction along the connecting direction of the power supply board to the relay connector.

25. The lighting device according to claim 24, wherein the second positioning structure includes a second positioning portion provided on the chassis side and in contact with the power supply board during a movement of the power supply board between the non-connected position and the connected position.

26. The lighting device according to claim 1, wherein the cover has a board stopper in contact with the power supply board from a side opposite from the chassis.

27. The lighting device according to claim 26, wherein the board stopper is in contact with the front end portion of the power supply board at the front end with respect to the connecting direction of the power supply board.

28. The lighting device according to claim 1, wherein the cover has a board support portion projecting toward the power supply board and being in contact with the power supply board so as to support the power supply board.

29. The lighting device according to claim 28, wherein the board support portion includes at least one center support portion supporting a center portion of the power supply board with respect to the second direction perpendicular to the first direction that is along the connecting direction of the power supply board to the relay connector.

30. The lighting device according to claim 29, wherein the at least one center support portion includes a plurality of center support portions arranged parallel to each other in the second direction.

31. The lighting device according to claim 29, wherein the at least one center support portion is arranged adjacent to the relay connector.

32. The lighting device according to claim 28, wherein the board support portion includes at least one end support portion supporting an end of the power supply board with respect to the second direction perpendicular to the first direction that is along the connecting direction of the power supply board to the relay connector.

33. The lighting device according to claim 32, wherein the at least one end support portion includes a pair of end support portions, each supporting a corresponding end of the power supply board.

34. The lighting device according to claim 1, wherein:
the chassis has a connector insertion hole that is a through hole through which the relay connector is passed; and
the cover has at least one connector hole that is a through hole in which the relay connector is fitted, the connector hole continuing into the insertion hole.

35. The lighting device according to claim 34, wherein the connector insertion hole is larger than the connector hole.

36. The lighting device according to claim 35, wherein the cover has a holding protrusion fitted in the connector insertion hole.

37. The lighting device according to claim 36, further comprising a rib projecting from an edge of the connector hole toward the power supply board, wherein the blocking portion is connected to the rib.

38. The lighting device according to claim 34, wherein:
the at least one connector hole includes a plurality of connector holes arranged in a parallel layout with respect to the second direction perpendicular to the first direction that is along the connecting direction of the power supply board to the relay connector; and
the cover has a blocking portion in an area between the adjacent connector holes, the blocking portion protruding toward the power supply board so as to be in contact with the power supply board connected to the relay connector.

39. The lighting device according to claim 38, wherein the blocking portion is in contact with the front end portion of the power supply board with respect to the connecting direction, the power supply board being connected to the relay connector.

40. The display device according to claim 39, wherein the display panel is a liquid crystal panel including liquid crystals sealed between substrates.

41. A display device, comprising:
the lighting device according to claim 1; and
a display panel arranged configured to provide display using light from the lighting device.

42. A television receiver comprising the display device according to claim 41.

* * * * *